United States Patent
Takahashi et al.

(10) Patent No.: US 7,278,586 B2
(45) Date of Patent: Oct. 9, 2007

(54) IC CARD, IC CARD MANUFACTURING METHOD, IC CARD MANUFACTURING APPARATUS AND IC CARD JUDGMENT SYSTEM

(75) Inventors: Hideki Takahashi, Tokyo (JP); Ryoji Hattori, Tokyo (JP)

(73) Assignee: Konica Minolta Holdings, Inc., Tokyo (JP)

( * ) Notice: Subject to any disclaimer, the term of this patent is extended or adjusted under 35 U.S.C. 154(b) by 0 days.

(21) Appl. No.: 11/456,422

(22) Filed: Jul. 10, 2006

(65) Prior Publication Data

US 2006/0237545 A1  Oct. 26, 2006

Related U.S. Application Data

(62) Division of application No. 10/740,215, filed on Dec. 18, 2003, now Pat. No. 7,143,953.

(30) Foreign Application Priority Data

Dec. 27, 2002 (JP) ............................. 2002-381148
Dec. 27, 2002 (JP) ............................. 2002-381197

(51) Int. Cl.
*G06K 7/10* (2006.01)

(52) U.S. Cl. ...................... 235/494; 235/454; 235/487; 235/492

(58) Field of Classification Search ................ 235/494, 235/454, 487, 492
See application file for complete search history.

(56) References Cited

U.S. PATENT DOCUMENTS

| | | | |
|---|---|---|---|
| 4,583,766 A * | 4/1986 | Wessel | 283/88 |
| 5,142,383 A * | 8/1992 | Mallik | 359/2 |
| 6,138,913 A * | 10/2000 | Cyr et al. | 235/468 |
| 7,143,953 B2 * | 12/2006 | Takahashi et al. | 235/494 |
| 2003/0065938 A1* | 4/2003 | Kitamura et al. | 713/200 |
| 2003/0205399 A1* | 11/2003 | Uchihiro et al. | 174/52.4 |
| 2003/0210805 A1* | 11/2003 | Lofgren et al. | 382/100 |

\* cited by examiner

*Primary Examiner*—Daniel A. Hess
(74) *Attorney, Agent, or Firm*—Lucas & Mercanti, LLP

(57) ABSTRACT

An IC card comprising: an IC module including an IC-chip in which intrinsic information is stored at the stage of card manufacturing or card issuing and an antenna supported by an antenna supporting member; and two base plates between which the IC module incorporated with an adhesive layer; wherein hidden intrinsic information corresponding to the stored intrinsic information is recorded on a part of the antenna supporting member in such a way that the hidden intrinsic information is invisible by reflection light from the surface of the IC card and is read out from transmission light due to a transmission density difference between the recorded part of the hidden intrinsic information and a non-recorded part.

16 Claims, 13 Drawing Sheets

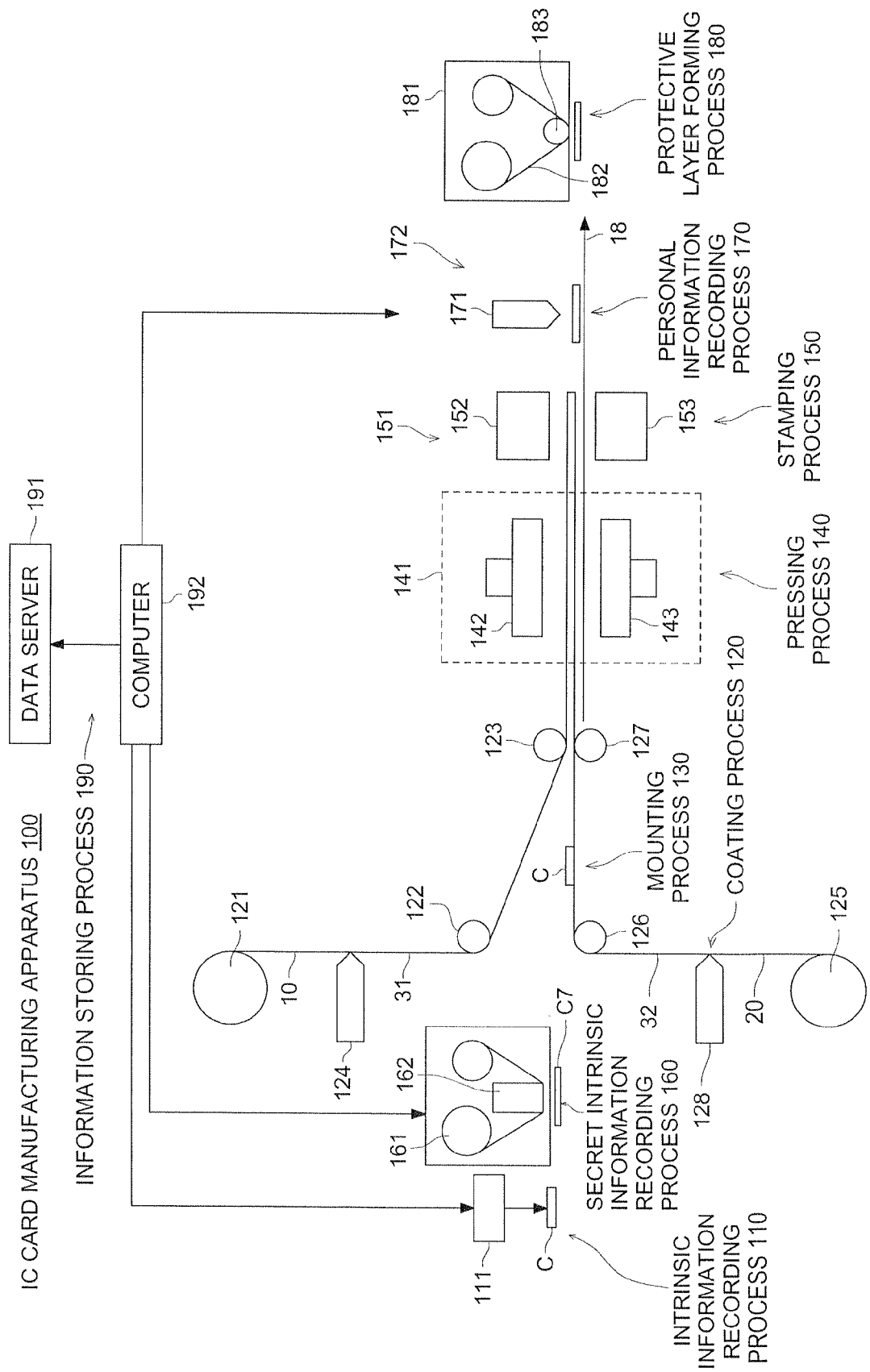

FIG. 8 ( a )
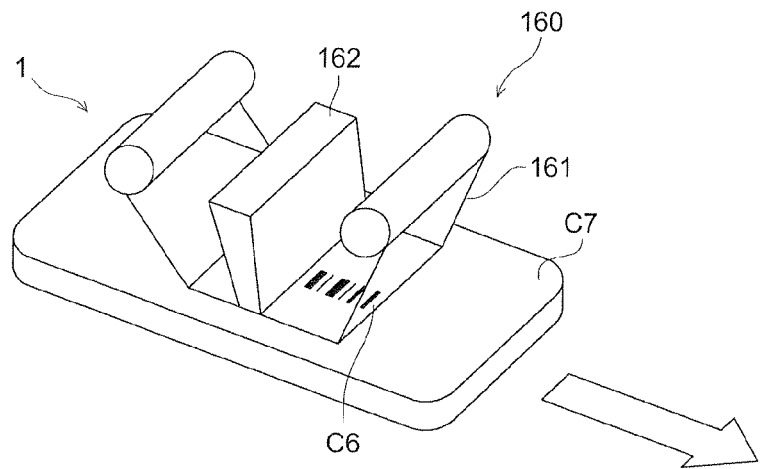
FIG. 8 ( b )
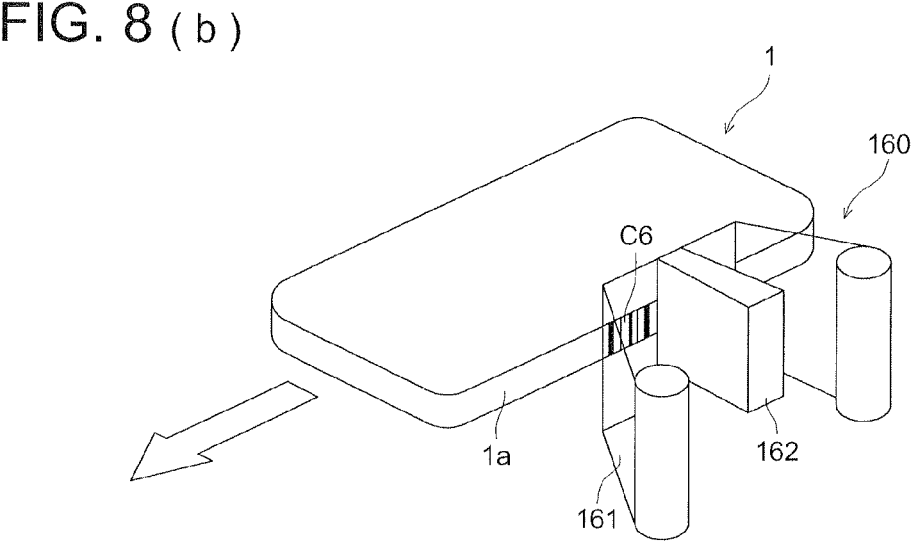
FIG. 8 ( c )
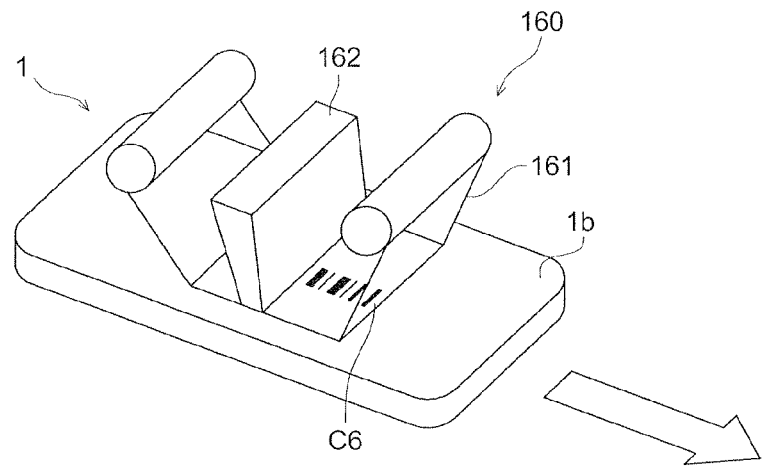

IC CARD, IC CARD MANUFACTURING METHOD, IC CARD MANUFACTURING APPARATUS AND IC CARD JUDGMENT SYSTEM

CROSS REFERENCE TO RELATED APPLICATIONS

This is a Divisional of U.S. patent application Ser. No. 10/740,215 filed Dec. 10, 2003, now U.S. Pat. No. 7,143,953 which, in turn, claimed the priority of Japanese Patent Application Nos. JP2002-381148 filed Dec. 27, 2002 and JP2002-381197 filed Dec. 27, 2002, the priority of all three applications is hereby claimed and all three applications are hereby incorporated herein by reference.

FIELD OF THE INVENTION

The present invention relates to a noncontact-type electronic card which stores personal information requiring security with respect to prevention of forgery or alternation, or an IC card which is suitably applied in a system thereof, an IC card manufacturing method, an IC card manufacturing apparatus and an IC card judgment system.

BACKGROUND OF THE INVENTION

As an identification card (ID card) or a credit card, a magnetic card which record data by means of a conventional magnetic recording method has been commonly utilized. However, a magnetic card had problems of insufficient anti-tampering with data due to the ease of rewriting of the data, of insufficient protection of data due to environmental susceptibility of magnetic record and of insufficient memory capacity. Therefore, an IC card including an IC-chip has become popular in recent years.

An IC card exchanges data by reading and writing with external equipment via an electric junction provided in the surface or a loop antenna in the card. An IC card has memory capacity larger than that of a magnetic card and has been greatly improved in security. Particularly, a noncontact-type IC card provided with an IC-chip and an antenna for information exchange with external equipment in the card, is superior in security compared to a contact-type IC card provided with an electric junction on the surface, and has come to be utilized for the purpose of data secrecy and prevention of forgery or alternation being highly required such as an IC card.

There disclosed a card, as such examples, in which the first support and the second support being laminated sandwiching an adhesive, in the layer of which sealed is an IC module including an IC-chip and an antenna (for example, JP-A No. 2000-182019 (hereinafter, JP-A refers to Japanese Patent Publication Open to Public Inspection)).

Since the IC card described in JP-A 2000-182019 exhibits high security, durability thereof has become important also with respect to forgery and alternation. Particularly, various attempts have been made to assure the durability, because an IC-chip and electric parts such as an antenna for information exchange with external equipment are included in an IC card. However, still higher durability has been required in accordance with the utilization for various purposes and pervasion. In view of IC card characteristics, required is high durability against repeated bending and stress by falling or coins while always being carried in a pocket of pants. For this purpose, improvement by providing a strong reinforcement structure in an IC-chip has been proposed.

However, although a limited improvement of durability was observed, there caused a crack of an IC-chip or a break of a card to make electric operations impossible due to insufficient durability in various situations, resulting in problems of impossible confirmation of card certification information or personal certification information.

Further, in case of data in an IC-chip had been tampered or intentionally broken by a third person with malice, it was difficult to judge whether the IC card or the IC-chip was true or false, or whether it had been damaged during the manufacturing process. Conventionally, an IC card in which intrinsic information for card certification or personal certification information is provided in an IC-chip not as to be easily readable and a serial number is visually printed on the surface by such as a laser, has been utilized, however, there was not necessarily a sufficient effect to prevent forgery and alternation against a third person with malice, who might tamper the data while leaving the serial number because it was visible. Further, printing visually on the surface might limit the design of an IC card and tended to allow misuse by a third person with malice.

There is a possibility that intrinsic information may be tampered, forged or misused by a third person with malice when intrinsic information is provided on the card surface as visible information. Although security of a card is improved by providing intrinsic information on the card surface as invisible information, there is a possibility that the card may be tampered and misused by scratching the surface when the information is once made visible and recognized.

Further, also in the manufacturing process of an IC card, in case that information in an IC-chip became unreadable, there was a problem of time-consumption for the investigation to pursue the reason and reproduce the card, resulting in delay of reissue and decrease of manufacturing yield and efficiency.

SUMMARY OF THE INVENTION

This invention has been made in view of these points, and an objective of this invention is to provide an IC card, an IC card manufacturing method, an IC card manufacturing apparatus and an IC card judgment system, which are able to improve security, as well as to improve manufacturing efficiency and traceability in higher dimensions.

MEANS TO SOLVE THE PROBLEMS

To solve the problems described above and to achieve the objective, this invention has been constituted as following (1-1)-(1-12) and (2-1)-(2-12).

(1-1) An IC card constituted by arranging an IC module, including an IC-chip and an antenna, between two supports opposing to each other via an adhesive layer, characterized in that intrinsic information is recorded in said IC-chip at the stage of card manufacturing or card issuing, and secret intrinsic information is recorded at least on a part of an antenna support (antenna supporting member) which supports said antenna, said secret intrinsic information being invisible by reflection from the IC card surface but can be recorded and read out by transmission density differences between a non-recorded portion and a recorded portion.

According to the invention described in item (1-1), it is possible to enable judgment of forgery and alternation of an IC card and to improve security, by reading out secret intrinsic information, which has been recorded on a part of an antenna support and is invisible by reflection from the IC card surface but recorded and readable based on transmission density differences between a non-recorded portion and a recorded portion, to be collated with description on the surface of the IC card.

(1-2) The IC card described in item (1-1), characterized in that said secret intrinsic information has absorption in a visible light region and is readable based on transmission density differences between a non-recorded portion and a recorded portion.

According to the invention described in item (1-2), secret intrinsic information has absorption in a visible light region and is easily and surely readable based on transmission density differences between a non-recorded portion and a recorded portion.

(1-3) The IC card described in item (1-1), characterized in that said secret intrinsic information is provided by use of an infrared absorbing material and is essentially invisible in a visible light region but readable in an infrared wavelength region based on transmission density differences between a non-recorded portion and a recorded portion.

According to the invention described in item (1-3), secret intrinsic information is essentially invisible in a visible light region but easily and surely readable in an infrared wavelength region based on transmission density differences between a non-recorded portion and a recorded portion.

(1-4) The IC card described in any one of items (1-1)-(1-3), characterized in that said secret intrinsic information is one including an intrinsic card number or one including personal certification information.

According to the invention described in item (1-4), secret intrinsic information is one including an intrinsic card number or one including personal certification information, and thereby efficiency of reissue and manufacturing yield can be improved because such as intrinsic information, personal certification information and manufacturing information can be obtained even in the case of information in an IC-chip has been tampered or destroyed.

(1-5) The IC card described in any one of items (1-1)-(1-4), characterized in that an image receiving layer, on which personal certification information including a name and a face image is recorded, is provided on the one of said supports and a writing layer is provided on the other support.

According to the invention described in item (1-5), the IC card can be commonly applied to such as an identification card or a credit card by providing an image receiving layer, on which personal certification information including a name and a face image is recorded, on the one of said supports and a writing layer on the other support.

(1-6) An IC card manufacturing method characterized in that intrinsic information is recorded in an IC-chip of an IC module provided with an IC-chip and an antenna at the stage of card manufacturing or card issuing; secret intrinsic information is recorded on a part of an antenna support which supports said antenna; an adhesive is provided by coating between two supports opposing to each other; said IC module is mounted on a predetermined position between said supports; a card substrate is prepared by laminating said two supports opposing to each other; said card substrate is stamped into a card-shape to prepare an IC card; and personal certification information is provided on the card surface as well as in the IC-chip.

According to the invention described in item (1-6), manufactured can be an IC card, which can improve security as well as manufacturing efficiency and traceability in higher dimensions.

(1-7) An IC card manufacturing apparatus characterized by having an intrinsic information recording process where intrinsic information is recorded on an IC-chip of an IC module including an IC-chip and an antenna at the stage of card manufacturing or card issuing, a secret intrinsic information recording process where secret intrinsic information is recorded on a part of an antenna support which supports said antenna, a coating process where an adhesive is provided by coating between two supports opposing to each other, a mounting process where said IC module is mounted at a predetermined position between said supports, a pressing process where said two supports opposing to each other are laminated to prepare a card substrate, a stamping process where said card substrate is stamped into a card-shape to prepare an IC card, and a personal certification information recording process where personal certification information is provided on the card surface and in the IC-chip.

According to the invention described in item (1-7), manufactured can be an IC card, which can improve security as well as manufacturing efficiency and traceability in higher dimensions.

(1-8) An IC card manufacturing apparatus described in item (1-7), characterized in that a protective layer preparation process where a protective layer to protect said personal certification information is provided.

According to the invention described in item (1-8), durability against abrasion and chemicals as well as against pressure of such as falling or coins is improved by providing a protective layer to protect personal certification information.

(1-9) An IC card manufacturing apparatus described in item (1-7) or (1-8), characterized in that provided is an information storing process, where at least said intrinsic information and said secret intrinsic information are stored while being mutually collated in a data server, which stores card manufacturing and/or card issuing information data.

According to the invention described in item (1-9), true verification is possible as well as intrinsic information, personal certification information and manufacturing information can be easily obtained at such as inspection during manufacturing from a data server resulting in improvement of reissue efficiency and manufacturing yield, by storing at least intrinsic information and secret intrinsic information while being collated, even when the data in an IC-chip have been tampered or intentionally broken, or descriptions on the card surface have been tampered or forged.

(1-10) The IC card manufacturing method described in item (1-7), characterized in that said secret intrinsic information is provided by means of thermal transfer or inkjet in said intrinsic information recording process.

According to the invention described in item (1-10), secret intrinsic information is easily and surely provided by means of thermal transfer or inkjet.

(1-11) An IC card judgment system characterized in that provided are an information reading means, by which intrinsic information and secret intrinsic information of the IC card, described in any one of items (1-1)-(1-5), are read out, and a judgment system, in which intrinsic information and secret intrinsic information from said information reading means are collated and judgment of truth is performed.

According to the invention described in item (1-11), even in case of data having been tampered or intentionally broken, or descriptions on the card surface having been tampered or forged, truth and forgery or alternation can be easily and surely judged by collating intrinsic information and secret intrinsic information of the IC card.

(1-12) An IC card judgment system characterized in that provided are a data server, in which intrinsic information and secret intrinsic information of the IC card, described in any one of items (1-1)-(1-5), are stored while being collated; an information reading means, by which intrinsic information and secret intrinsic information of an IC card, described in any one of items (1-1)-(1-5), are read out; and a judgment system, in which either one of intrinsic information and secret intrinsic information from said information reading means and either one of intrinsic information and secret intrinsic information stored in said data server are collated and judgment of truth or collection of information is performed.

According to the invention described in item (1-12), even when data in an IC-chip have been tampered or intentionally broken, storing intrinsic information and secret intrinsic information of an IC card while being collated in a data server, allows easy and sure judgment of truth and forgery or alternation by reading out and collating either one of intrinsic information and secret intrinsic information of the IC card as well as improvement of reissue efficiency and manufacturing yield due to easy collection of information from a data server at such as inspection during manufacturing or after issue.

(2-1) An IC card constituted by arranging an IC module, including an IC-chip and an antenna, between two supports opposing to each other via an adhesive layer, characterized in that intrinsic information is recorded in said IC-chip at a card manufacturing stage or a card issuing stage, secret intrinsic information is recorded on the card surface and/or card cross-section by use of an infrared absorbing material which is essentially invisible in a visible light region.

According to the invention described in item (2-1), it is possible to judge forgery and alternation of an IC card and to improve security even in case of data in an IC-chip having been tampered or destroyed, by reading out and collating the intrinsic information and the secret intrinsic information.

(2-2) The IC card described in item (2-1), characterized by said secret intrinsic information being recorded by use of a bar cord.

According to the invention described in item (2-2), secret intrinsic information can be easily and surely recorded by use of a bar cord.

(2-3) The IC card described in item (2-1) or (2-2), characterized in that said secret intrinsic information is one including an intrinsic card number or one including personal certification information.

According to the invention described in item (2-3), secret intrinsic information is one including an intrinsic card number or one including personal certification information, and thereby reissuing efficiency and manufacturing yield can be improved because such as intrinsic information, personal certification information and manufacturing information can be obtained even in case of information in an IC-chip having been tampered or destroyed.

(2-4) The IC card described in any one of items (2-1)-(2-3), characterized in that an image receiving layer, on which personal certification information including a name and a face image is recorded, is provided on the one of said supports and a writing layer is provided on the other support.

According to the invention described in item (2-4), the IC card can be commonly applied to such as an identification card or a credit card by providing an image receiving layer, in which personal certification information including a name and a face image is recorded, on the one of said supports and a writing layer on the other support, and judgment of truth is possible by collating the visible personal certification information and the secret intrinsic information.

(2-5) An IC card manufacturing method characterized in that intrinsic information is recorded on an IC-chip of an IC module provided with an IC-chip and an antenna at the stage of card manufacturing or card issuing; an adhesive is provided by coating between two supports opposing to each other; said IC module is mounted on a predetermined position between said supports; a card substrate is prepared by laminating said two supports opposing to each other; said card substrate is stamped into a card-shape to prepare an IC card; secret intrinsic information, which is comprised of an infrared absorbing material and invisible in a visible light, is provided on the card surface or on the card cross-section and personal certification information is provided on the card surface as well as in the IC-chip.

According to the invention described in item (2-5), manufactured can be an IC card, which can improve security as well as manufacturing efficiency and traceability in higher dimensions.

(2-6) An IC card manufacturing apparatus characterized by having an intrinsic information recording process where intrinsic information is recorded in an IC-chip of an IC module including an IC-chip and an antenna at the stage of card manufacturing or card issuing; a coating process where an adhesive is provided by coating between two supports opposing to each other; a mounting process where said IC module is mounted at a predetermined position between said supports; a pressing process where said two supports opposing to each other are laminated to prepare a card substrate; a stamping process where said card substrate is stamped into a card-shape to prepare an IC card; a secret intrinsic information recording process where secret intrinsic information comprised of an infrared absorbing material, which is invisible in a visible light region, is recorded on the card surface or card cross-section of the stamped card; and a personal certification information recording process where personal certification information is provided on the card surface and in the IC-chip.

According to the invention described in item (2-6), manufactured can be an IC card, which can improve security as well as manufacturing efficiency and traceability in higher dimensions.

(2-7) An IC card manufacturing apparatus described in item (2-6), characterized in that a protective layer preparation process where a protective layer to protect said personal certification information is provided.

According to the invention described in item (2-7), durability against abrasion and chemicals as well as against pressure of such as falling or coins is improved by providing a protective layer to protect personal certification information.

(2-8) An IC card manufacturing apparatus described in item (2-6) or (2-7), characterized in that provided is an information storing process where at least said intrinsic information and said secret intrinsic information and/or said secret intrinsic information and said personal certification information are stored while being collated in a data server which stores card manufacturing and/or card issuing information data.

According to the invention described in item (2-8), truth verification is possible as well as intrinsic information, personal certification information and manufacturing information can be easily obtained by such as inspection during manufacturing from a data server resulting in improvement of reissue efficiency and manufacturing yield, even when the data in an IC-chip have been tampered, intentionally destroyed or descriptions on the card surface have been tampered or forged, by storing at least intrinsic information and/or secret intrinsic information while being collated.

(2-9) The IC card manufacturing method described in item (2-6), characterized in that said secret intrinsic information is provided by means of thermal transfer in said intrinsic information recording process.

According to the invention described in item (2-9), secret intrinsic information can be easily and surely provided by means of thermal transfer.

(2-10) An IC card judgment system characterized in that provided are an information reading means, by which intrinsic information and secret intrinsic information of an IC card, described in any one of items (2-1)-(2-4), are read out, and a judgment system, in which intrinsic information and secret intrinsic information from said information reading means are collated and judgment of truth is performed.

According to the invention described in item (2-10), even in case of data having been tampered or intentionally destroyed, or descriptions on the card surface having been tampered or forged, true and forgery or alternation can be easily and surely judged by reading out and collating the intrinsic information and the secret intrinsic information of the IC card.

(2-11) An IC card judgment system characterized in that provided are an information reading means, by which intrinsic information and secret intrinsic information of an IC card, described in any one of items (2-1)-(2-4), are read out; and a judgment means, by which secret intrinsic and personal certification information from said information reading means are collated and judgment of truth is performed.

According to the invention described in item (2-11), true and forgery or alternation can be easily and surely judged by reading out secret intrinsic information and personal certification information described on the card surface and collating them to judge truth.

(2-12) An IC card judgment system characterized in that provided are a data server, in which intrinsic information and secret intrinsic information of an IC card, described in any one of items (2-1)-(2-4), are stored while being collated; an information reading means, by which intrinsic information and secret intrinsic information of an IC card, described in any one of items (2-1)-(2-4), are read out; and a judgment system, in which either one of intrinsic information and secret intrinsic information from said information reading means and either one of intrinsic information and secret intrinsic information stored in said data server are collated and judgment of truth or collection of information is performed.

According to the invention described in item (2-12), even when data on an IC-chip have been tampered or intentionally destroyed, storing intrinsic information and secret intrinsic information of an IC card while being collated in a data server, allows easy and sure judgment of truth and forgery or alternation by reading out and collating either one of intrinsic information and secret intrinsic information of the IC card as well as improvement of reissuing efficiency and manufacturing yield due to easy collection of information from a data server at such as inspection during manufacturing or after issue.

BRIEF DESCRIPTION OF THE DRAWINGS

FIG. 8 is an oblique view drawing of a secret intrinsic information recording apparatus.

EMBODIMENTS OF THE INVENTION

In the following, embodiments of an IC card, an IC card manufacturing method, an IC card manufacturing apparatus and an IC card judgment system for forgery and alternation will be detailed with reference to drawings, however this invention is not limited to these embodiments.

Figure 1:
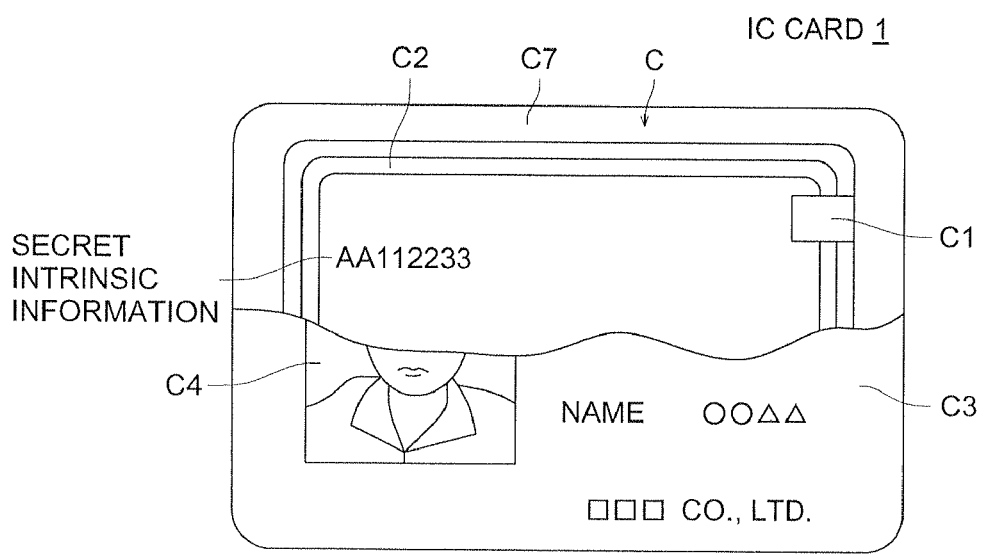
FIG. 1 is a plane drawing of a partly broken IC-card.
Figure 1:
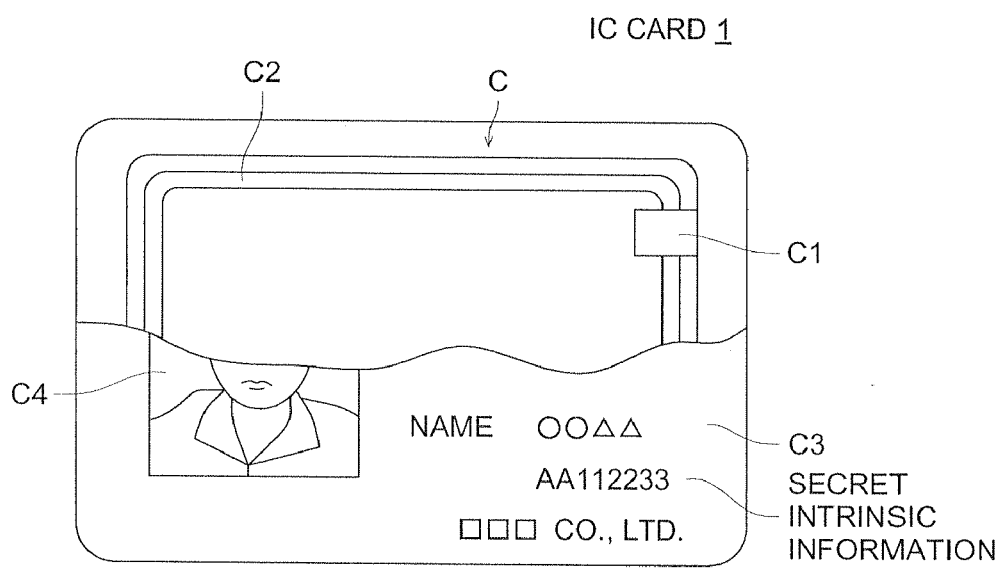

First, an IC card of this invention will be explained. FIGS. 1(*a*) and 1(*b*) are plane drawings to show partly broken IC cards, and FIGS. 2(*a*) and 2(*b*) are drawings to show layer configurations of an IC card. IC card 1 can be commonly utilized for an identification card and a credit card, and is constituted by arranging IC module C including IC-chip C1 and antenna C2 between first support 10 and second support 20 via adhesive layers 31 and 32. A reinforcement structure may be provided adjacent to IC-chip C1, thereby improved is durability also against repeated bending as well as pressure of falling or coins while the card is usually carried in a pocket of pants.

On the other hand, image receiving layer 33 is provided on first support 10, and personal certification information including name C3 and face image C4 is recorded on this image receiving layer 33. Further, writable writing layer 34 is provided on second support 20.

Protective layer 35 to protect personal identification information is provided on image receiving layer 33, thereby durability against abrasion and chemicals as well as pressure of falling or coins is improved.

This IC card 1 of FIGS. 1(*a*) and 1(*b*) records intrinsic information in IC-chip C1 at the stages of card manufacturing or card issuing and records secret intrinsic information at least in a part of antenna support C7.

Figure 3:
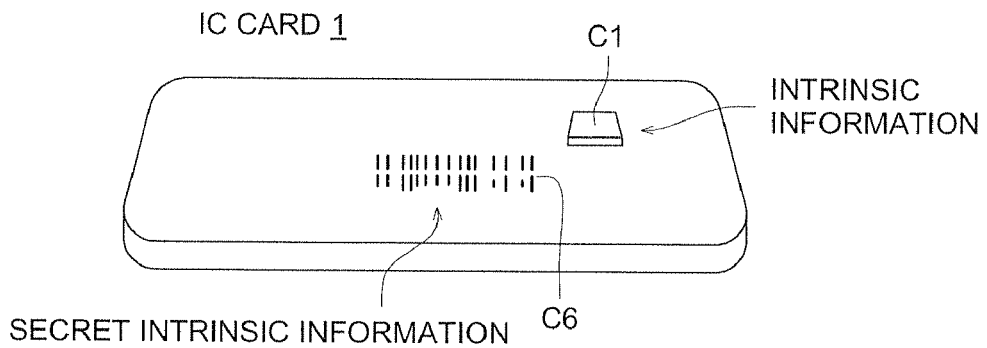
FIG. 3 is an oblique view drawing of an IC card.
Figure 3:
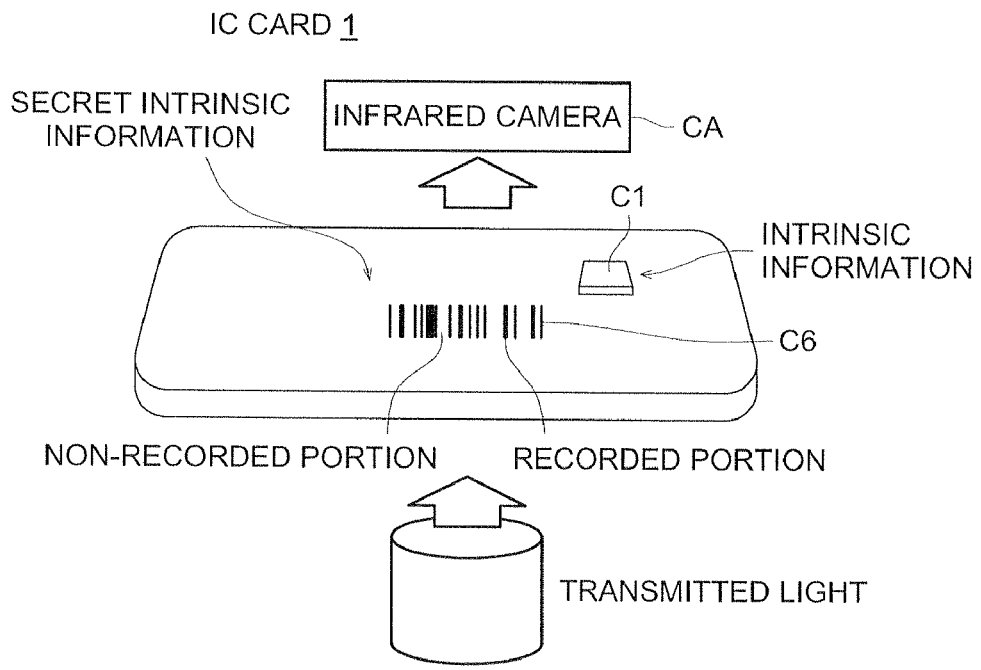
Figure 3:
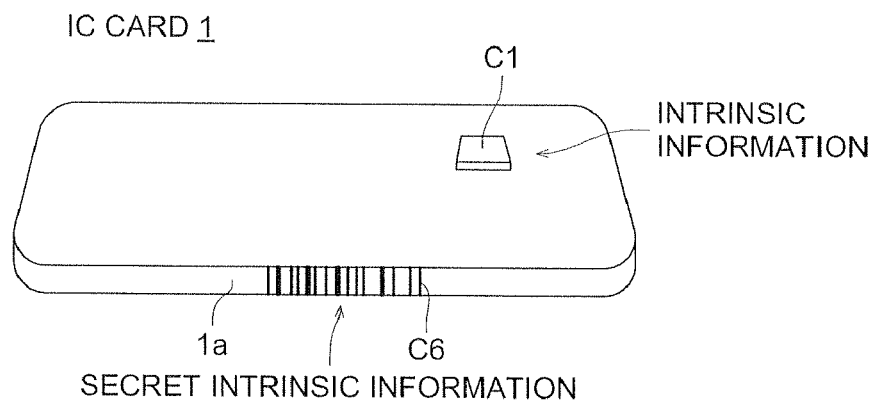

This secret intrinsic information recorded in a part of antenna support C7 cannot be visually recognized by the reflection from IC card surface as shown in FIG. 3(*a*), however, is recorded to be readable by use of infrared camera CA with irradiation of back light based on transmission density differences between a non-recorded portion and a recorded portion as shown in FIG. 3(*b*). In this embodiment, secret intrinsic information is provided by use of an infrared absorbing material and is essentially invisible in a visible light region while easily and surely readable based on the transmission density differences between a non-recorded portion and a recorded portion.

Further, the IC card 1 of FIGS. 1(*b*) and 2(*b*) records intrinsic information in IC-chip C1 at the stage of card manufacturing or card issuing and records secret intrinsic information on the card surface and/or card cross-section by use of an infrared absorbing material which is essentially invisible in a visible light region.

In FIG. 1(*b*), secret intrinsic information is recorded on the card surface by use of an infrared absorbing material which is essentially invisible in a visible light region, however, it may be also recorded on the card cross-section by use of an infrared absorbing material which is essentially invisible in a visible light region as shown in FIG. 3(c). In the embodiment of FIG. 3(c), secret intrinsic information is recorded by means of bar cord C6 on card cross-section 1a, however, it may be also recorded on the card surface by means of a bar cord; thus, secret intrinsic information is easily and surely recorded by means of bar cord C6.

In these IC cards explained above, it is possible to judge forgery or alternation of an IC card resulting in improvement of security, by reading out and collating the intrinsic information and secret intrinsic information, even in case that information in IC-chip C1 has been tampered or destroyed.

Further, secret intrinsic information is one including a card intrinsic number or one including personal identification information, and reissuing efficiency or manufacturing yield can be improved because of such as intrinsic information, personal identification information and manufacturing information being obtainable even in case of information in an IC-chip having been tampered or destroyed.

Figure 4B:
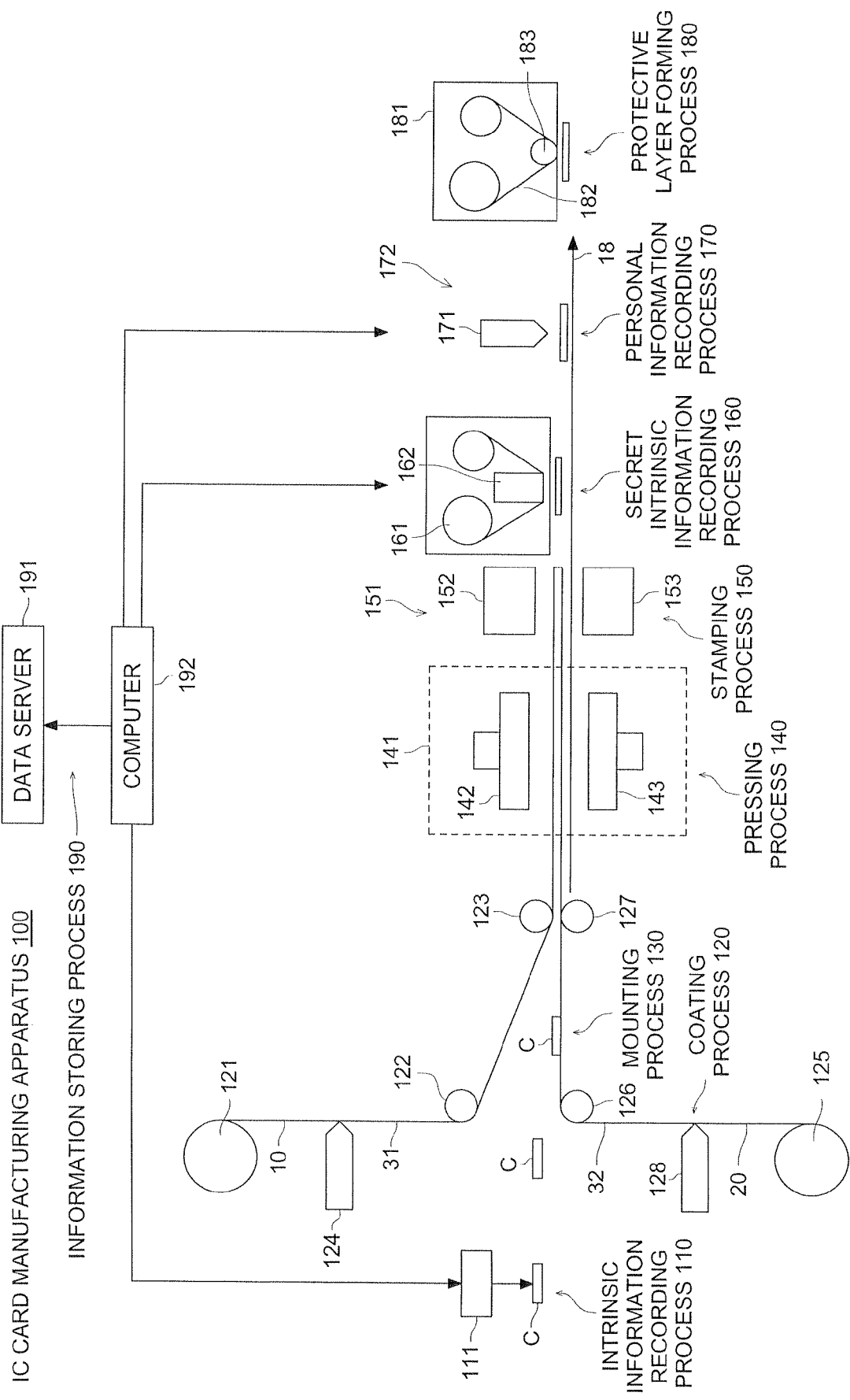
FIG. 4 is a brief constitution drawing of an IC card manufacturing apparatus.

Next, an IC card manufacturing method and an IC card manufacturing apparatus will be explained. FIGS. 4(a) and 4(b) are brief constitutional drawings of an IC card manufacturing apparatus.

IC card manufacturing apparatus 100 of this embodiment is provided with intrinsic information recording process 110, secret intrinsic information recording process 160, coating process 120, mounting process 130, pressing process 140, stamping process 150, personal identification information recording process 170, protective layer forming process 180 and information storing process 190.

In intrinsic information recording process 110, intrinsic information is recorded in IC-chip C1 of IC module C at the stage of card manufacturing or card issuing. In this embodiment, memorized are such as a manufacturing number, a manufacturing lot, inspection information, a manufacturer as intrinsic information, and such as a name, an address and an age as personal certification information, in IC-chip C1 by use of reader-writer 111. Intrinsic information may not be ciphered, however is preferably ciphered with respect to security. Further, it is preferable to incorporate a commonly known collation method such as Hash function or a cipher key.

In the embodiment of this invention shown in FIG. 4(a), secret intrinsic information is recorded on a part of antenna support C7 for antenna C in an IC module in secret intrinsic information recording process 160.

Figure 5:
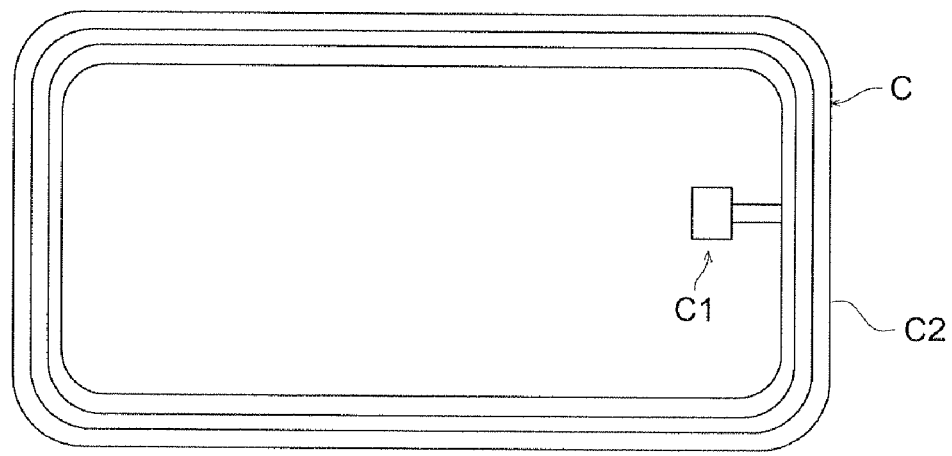
FIG. 5 is a schematic drawing of an IC module.

FIG. 5 is a schematic drawing of an IC module, and IC-chip C1 is connected to antenna C2 which is composed of copper wire wound four times. It can be utilized as a fixing layer of this invention, however, types of FIGS. 6 and 7 are preferably utilized with respect to position accuracy of an IC-chip.

Figure 6:
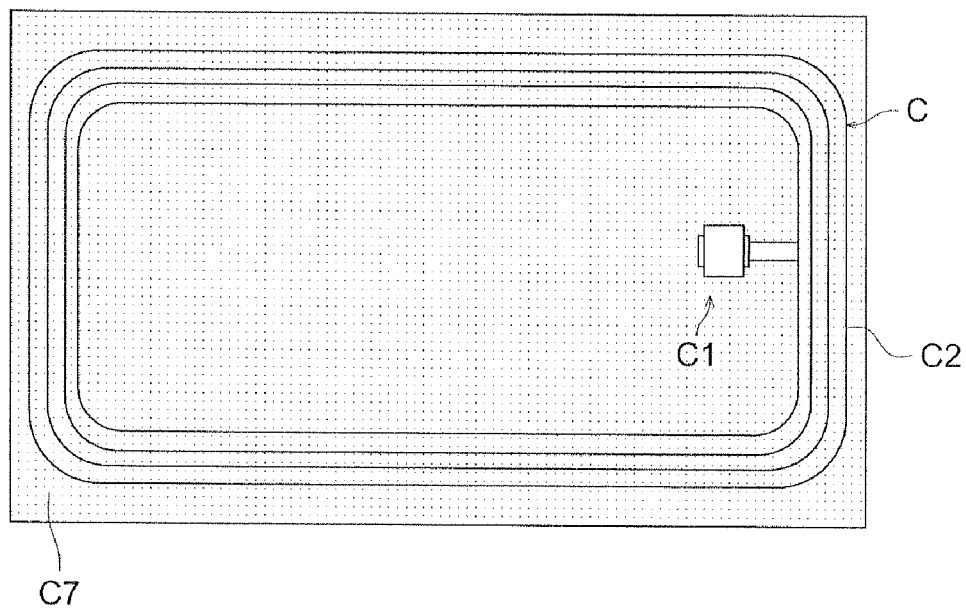
FIG. 6 is a schematic drawing of an IC fixing.
Figure 7:
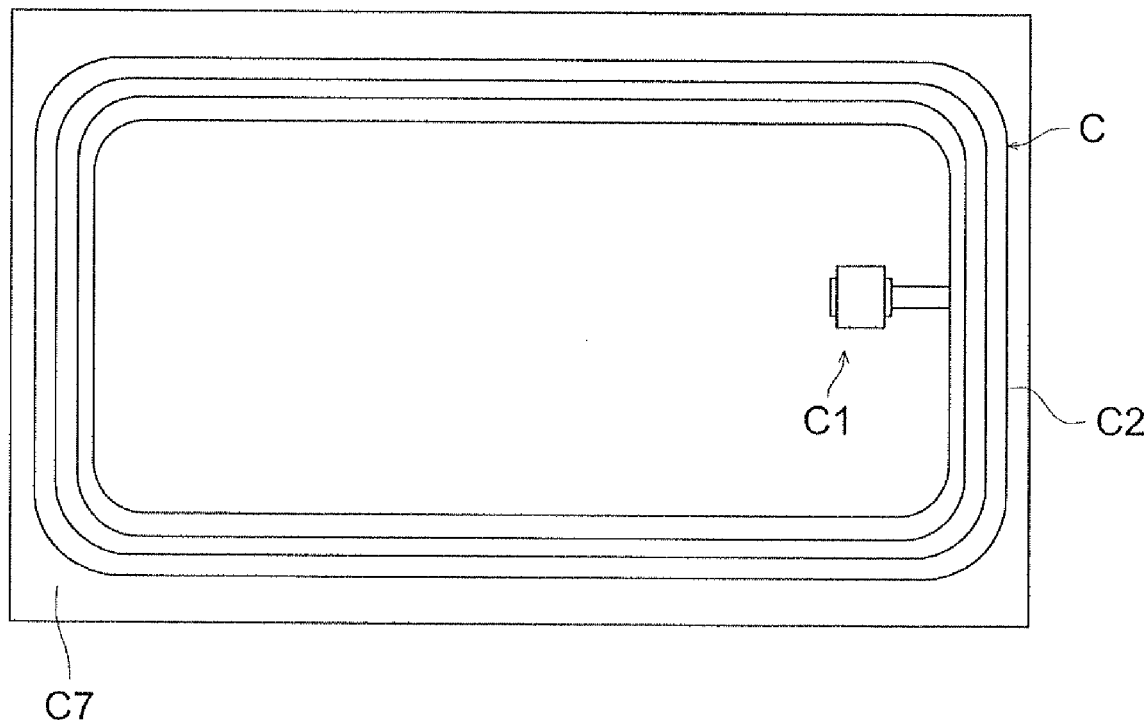
FIG. 7 is a schematic drawing of an IC fixing.

FIGS. 6 and 7 are schematic drawings of IC fixing utilized in this invention. In FIG. 6, antenna support C7 is constituted of a non-woven fabric type. The schematic drawing shows that non-woven fabric, on which a printed pattern is formed, and an IC-chip are adhered by means of such as bonding, and an IC-chip reinforcement plate stands at least on the one-side of an IC-chip to cover more than 50% of the IC-chip. IC card sheet "FT Series", manufactured by Hitachi Maxell Co., Ltd., can be also utilized.

In FIG. 7, antenna support C7 is constituted of a printed circuit board type. The schematic drawing shows that non-woven fabric, on which a printed pattern is formed, and an IC-chip are adhered by means of such as bonding, and an IC-chip reinforcement plate stands at least on the one-side of an IC-chip to cover more than 50% of the IC-chip. When non-woven fabric as shown in FIG. 6, that is a porous resin sheet, is utilized, an immersion property of an adhesive at the time of thermal lamination is improved resulting in superior adhesion between members.

In this embodiment, as shown in FIG. 8(a), by utilizing infrared absorbing material ribbon 161 and thermal head 162, a secret intrinsic information is easily and surely provided on the surface of antenna support C7 by means of thermal transfer using bar cord C6. Secret intrinsic information is information including a card intrinsic number, or information including personal identification information, and secret intrinsic information may be the same as or different from intrinsic information recorded in an IC-chip, and this invention is achieved by enabling mutual information to be collated.

In the embodiment of this invention shown in FIG. 4(b), secret intrinsic information, comprised of an infrared absorbing material which is invisible in a visible light region, is provided on the stamped IC card surface or cross section, in secret intrinsic information recording process 160. In this embodiment, as shown in FIGS. 8(a) and 8(c), secret intrinsic information can be easily and surely provided on card cross-section 1a or card surface 1b of IC card 1 by means of thermal transfer using bar cord C6, utilizing infrared absorbing material ribbon 161 and thermal head 162. Secret intrinsic information is information including a card intrinsic number or information including personal certification information, and secret intrinsic information may be the same as or different from intrinsic information recorded on an IC-chip, and this invention is achieved by enabling mutual information to be collated.

In coating process 120, an adhesive is provided by coating between two supports (two base plates) opposing to each other. In this embodiment, sending-out axis 121 is equipped, and first support 10 being sent out from this sending-out axis 121 is supplied while being hung on guide roller 122 and drive roller 123. Applicator coater 124 is arranged between sending-out axis 120 and guide roller 122. Applicator coater 124 coats adhesive layer 31 at a predetermined thickness on first support 10.

Further, sending-out axis 125 which send out second support 20 is equipped and second support 20 being sent out from this sending-out axis 125 is supplied while being hung on guide roller 126 and drive roller 127. Applicator coater 128 is arranged between sending-out axis 125 and guide roller 126. Applicator coater 128 coats adhesive layer 32 at a predetermined thickness on second support 20.

In mounting process 130, an IC module is mounted at a predetermined position between the supports. In this embodiment, first support 10 on which adhesive layer 31 having been coated, and second support 20 on which adhesive layer 32 having been coated, are brought into contact to be transported along transporting passage 18 from the state of opposing to each other while being separated. IC module C is mounted by inserting at the position where first support 10 and second support 20 opposing to each other while being separated. IC module C is fed as a single unit or plural units in a sheet-form or a roll-form.

In pressing process 140, two supports opposing to each other are laminated to form a card substrate. In this embodiment, heat laminator section 141 is arranged along a transport direction of first support 10 and second support 20. A heat laminator is preferably a vacuum heat laminator. Further, protective film supply sections may be provided before heat laminator section 141 and are preferably arranged over and under the transport passage while opposing to each other. Heat laminator section 141 is constituted of flat heat laminator over-type 142 and heat laminator under-type 143 arranged over and under the transport passage opposing to each other. Heat laminator over-type 142 and heat laminator under-type 143 are set to be shiftable in a direction of contacting with and separating from each other.

Figure 9:
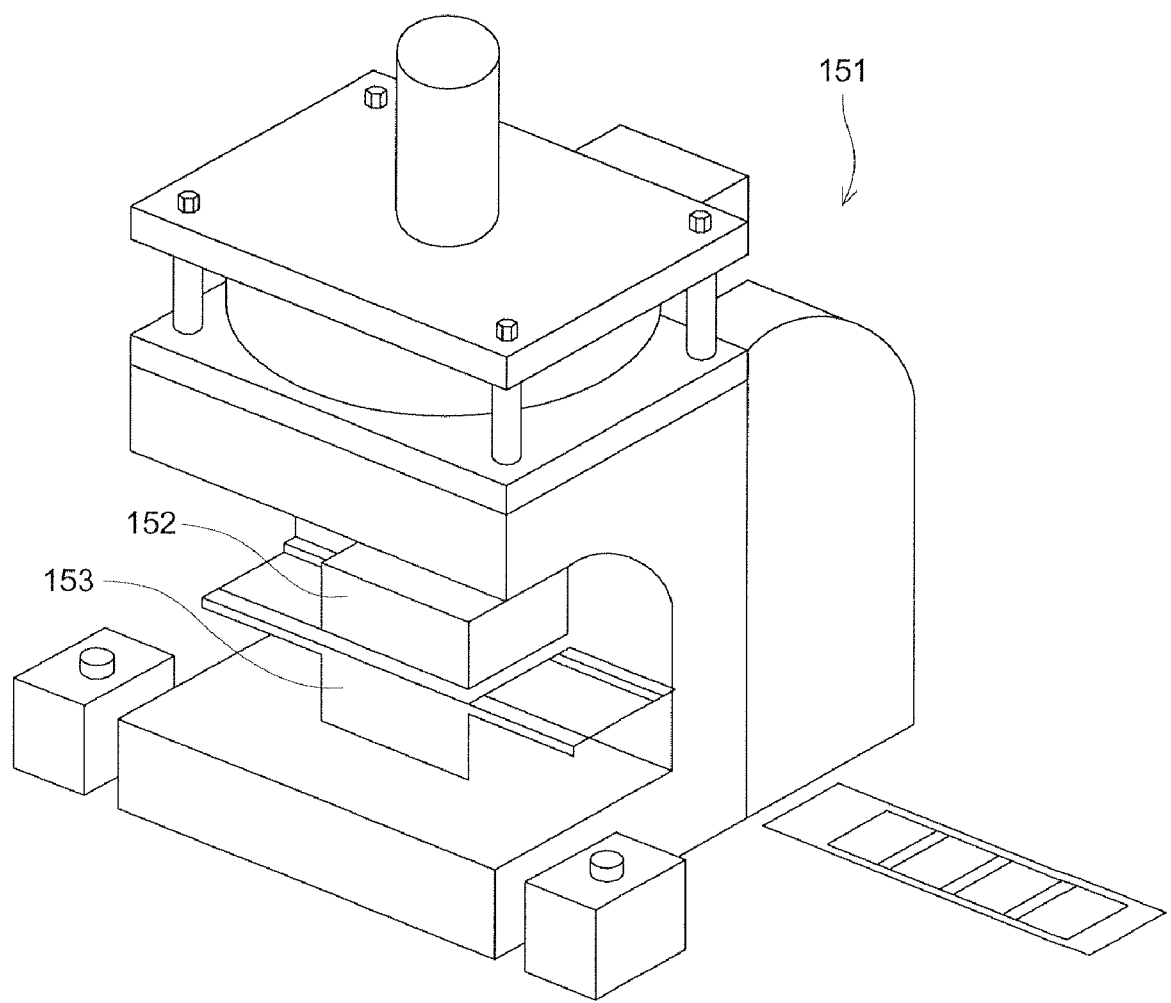
FIG. 9 is a brief whole oblique view drawing of a stamping dies apparatus.
Figure 10:
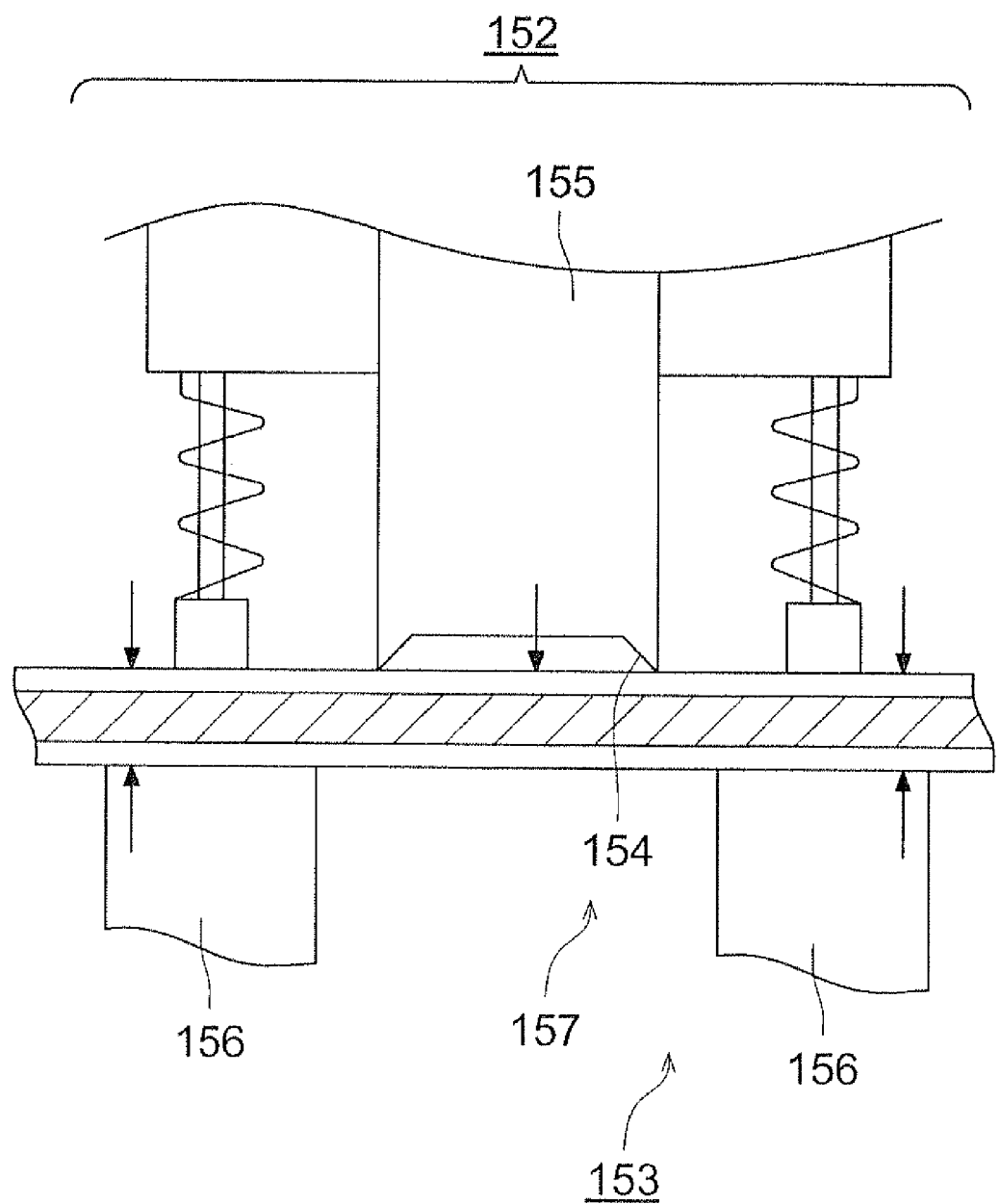
FIG. 10 is a front end drawing of a main part of a stamping dies apparatus.

In stamping process 150, a card substrate is stamped into a card shape to prepare an IC card. In this embodiment, as shown in FIGS. 9 and 10, stamping dies apparatus 151 is equipped with a stamping dies having upper blade 152 and under blade 153. Herein, upper blade 152 includes stamping punch 155 provided with escape 154 at the inside of an outer edge, and under blade 153 has stamping dies 156. An IC card having the same size as that of dies hole 157 is stamped by descending stamping punch 155 into dies hole 157 provided at the center of stamping dies 156. Further, for this purpose, the size of stamping punch 155 is made slightly smaller than that of dies hole 157.

In personal identification information recording process 170, personal certification information is provided on the card surface and in an IC-chip. In this embodiment, personal certification information is recorded on the card surface by recording head 171, and is written in an IC-chip by reader-writer 172.

In protective layer forming process 180, a protective layer to protect personal certification information is provided. In this embodiment, personal certification information is protected by transferring a protective layer from transfer foil 182 being set in transfer foil cassette 181 onto IC card 1 by use of heat roller 183.

In information storing process 190, at least intrinsic information and secret intrinsic (hidden intrinsic) information are stored while being collated in data server 191 which stores card manufacturing and/or card issuing information data. In this embodiment, at least intrinsic information and secret intrinsic information are stored while being collated by use of computer 192. Further, this computer 192 sends intrinsic information to reader-writer 111 and records it in IC-chip C1. In addition, computer 192 sends secret intrinsic information to thermal head 162 and records it in a part of an antenna support which supports an antenna.

Storing at least intrinsic information and secret intrinsic information while being collated in data server 191 makes it possible to judge truth as well as to promote reissue and manufacturing yield improvement due to easy collection of such as intrinsic information, personal certification information and manufacturing information from data server 191 at the time of inspection during manufacturing, even in case that data in IC-chip C1 have been tampered or intentionally destroyed, or descriptions on the card surface have been tampered or forged.

Figure 11:
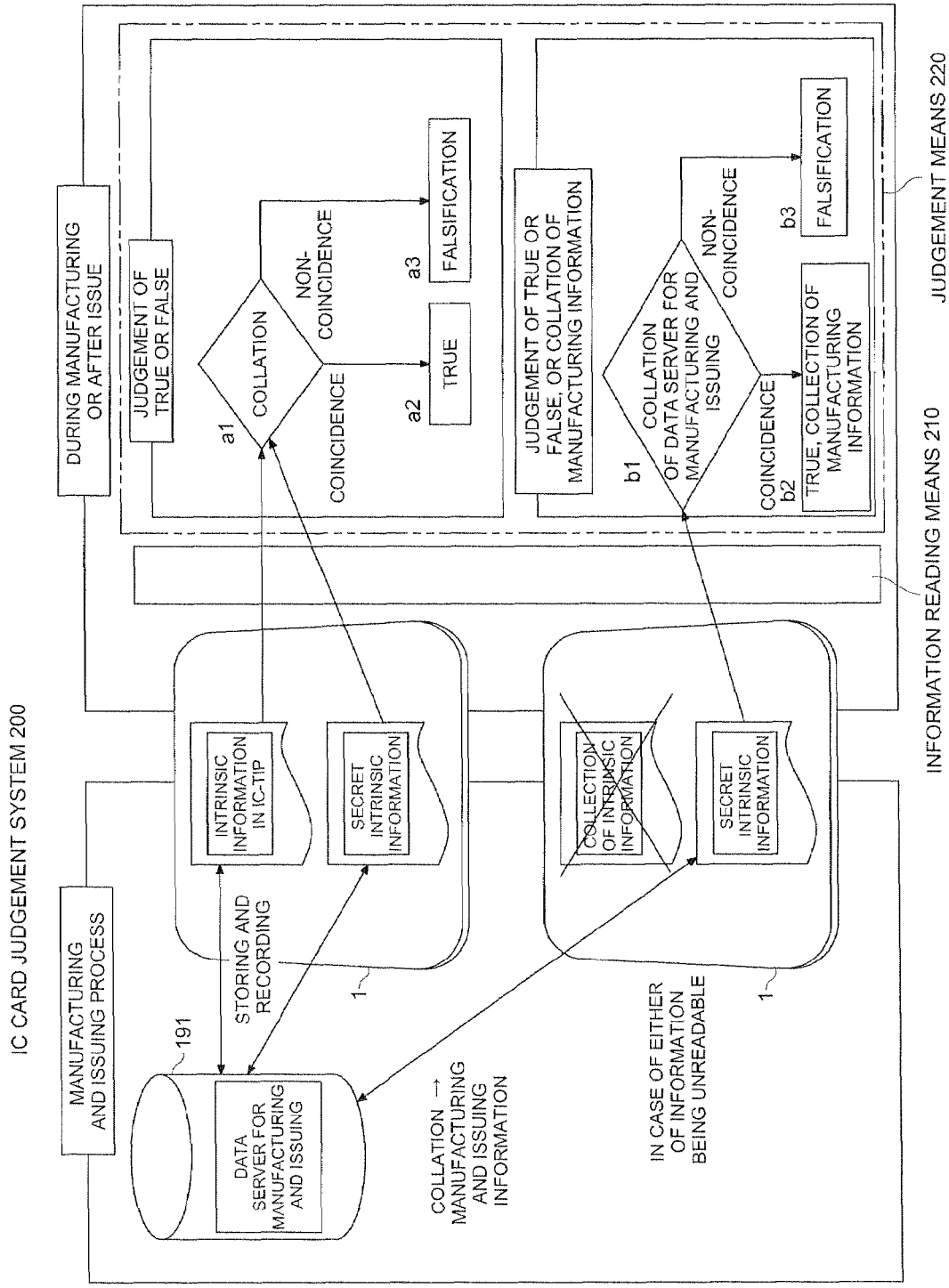
FIG. 11 is a brief constitution drawing of an IC card judgment system.

FIG. 11 is a brief constitution drawing of an IC card judgment system. IC card judgment system 200 of this embodiment is provided with data server 191, information reading means 210 and judgment means 220.

In data server 191, stored are intrinsic information and secret intrinsic information while being collated. The method to collate data is not specifically limited and applied can be such methods as one in which mutual data having been collated in advance are recorded in IC card 1, and one in which the same characteristic symbol or number is provided in a part of mutual information.

Information reading means 210 is, for example, constituted of such as a noncontact reader-writer and an infrared ray camera, and intrinsic information of an IC card is read out by the noncontact reader-writer while secret intrinsic information is read out by the infrared ray camera to be sent to judgment means 220.

Judgment means 220 is, for example, constituted of a computer, and collates intrinsic information and secret intrinsic information obtained from information reading means 210 (step a1). Collation methods are not specifically limited and commonly known collation methods can be utilized.

An IC card is judged to be true when intrinsic information and secret intrinsic information coincide (step a2), and is judged not to be true but forged or altered when they do not coincide (step a3).

Thus, judgment of truth and forgery or alternation can be easily and surely performed by reading out and collating the intrinsic information and secret intrinsic information of IC card 1, even when data in IC-chip C1 have been tampered or intentionally destroyed or descriptions on the card surface have been tampered or falsified. Secret intrinsic information may be the same as or different from intrinsic information recorded in an IC-chip, and this invention can be achieved by enabling mutual information to be collated.

Further, in judgment means 220, when either one of intrinsic information or secret intrinsic information is unreadable from information reading means 210, either one of read out information and either one of intrinsic information or secret intrinsic information stored in data server 191 are collated (step b1) to judge the card to be true when they coincide, resulting in obtaining information for manufacturing and issuing (step b2), and to be forged or altered when they do not coincide (step b3). Issuing information includes personal identification information.

In case that either of intrinsic information or secret intrinsic information recorded on IC card 1 is unreadable, either one of information readable and information for manufacture and issue having been recorded in data server 191 are collated to judge the truth and to obtain information for manufacture and issue.

Thus, storing at least intrinsic information and secret intrinsic information while being collated in data server 191 allows easy and sure judgment of truth and forgery or alternation as well as can promote reissue and improvement of manufacturing yield due to easy collection of information for manufacture and issue from data server 191 at such as inspection during manufacturing or after issue, even in case that data in IC-chip C1 have been tampered or intentionally destroyed, or descriptions on the card surface have been tampered or falsified.

Figure 12:
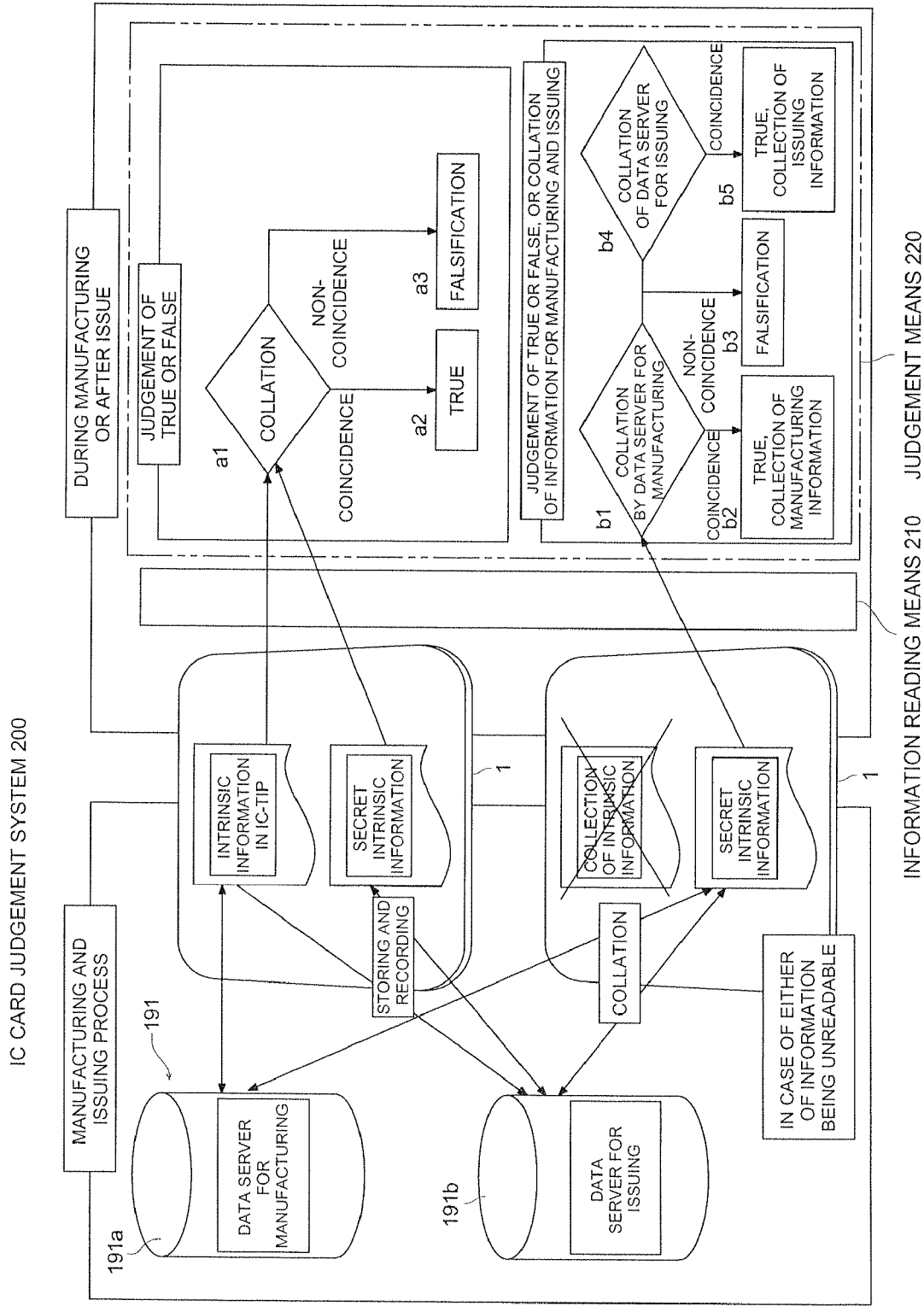
FIG. 12 is a brief constitution drawing of another embodiment of an IC card judgment system.

FIG. 12 is a brief constitution drawing of another embodiment of an IC card judgment system. ID card judgment system 200 of this embodiment, being equipped with data server 191, information reading means 210 and judgment means 220, is constituted in a similar manner as the embodiment of FIG. 11, however, data server 191 is equipped with manufacture data server 191a and issue data server 191b exclusively.

In manufacture data server 191a, stored are intrinsic information with respect to issue of IC card 1 and secret intrinsic information while being collated, and in issue data server 191b, stored are intrinsic information with respect to manufacture and secret intrinsic information while being collated.

Judgment system 220 collates intrinsic information and secret intrinsic information from information reading means 210 (step a1), to judge to be true when intrinsic information and secret intrinsic information coincide (step a2), or to judge to be not true but falsified or altered when they do not coincide (step a3).

Further, in judgment means 220, when either one of intrinsic information or secret intrinsic information is unreadable from information reading means 210, either one of read out information and either one of intrinsic information or secret intrinsic information stored in data server 191a are collated (step b1), so as to judge the card to be true when they coincide resulting in collection of manufacture information (step b2), and to be falsified or altered when they do not coincide (step b3).

Further, when either one of intrinsic information or secret intrinsic information from information reading means 210 is unable to be read out, either one of read out information and either one of intrinsic information or secret intrinsic information stored in data server 191b are collated (step b4), so as to judge the card to be true when they coincide, resulting in collection of issue information (step b5), and to be falsified or altered when they do not coincide (step b3).

When either one of intrinsic information or secret intrinsic information having been recorded in IC card 1 is unreadable, judgment of truth and collection of information for manufacture and issue can be performed by collating either readable information with information for manufacture and issue stored in data server 191.

Thus, storing at least intrinsic information and secret intrinsic information while being collated in manufacture data server 191a and issue data server 191b allows easy and sure judgment of truth and falsification or alternation as well as can promote reissue and improvement of manufacturing yield due to easy collection of information for manufacture and issue from data server 191 at such as inspection during manufacturing or after issue, even in case that data in IC-chip C1 have been be tampered or intentionally destroyed, or descriptions on the card surface have been tampered or falsified.

In the following, an IC card of this invention will be detailed.

[Intrinsic Information and Secret Intrinsic Information]

Intrinsic information is not specifically limited provided being discriminated individually and includes such as an certification number to certify the card, a lot number for manufacture management, inspection information and a cipher key as well as personal certification information (such as a name, an address, an employee number and a face image), a manufacturer and an issue machine number. Information may be ciphered, and preferably utilized are commonly known methods of ciphering or collation with respect to security. It may include information for ciphering and collation. The style of secret intrinsic information is not specifically limited provided being readable and to be discriminated and includes such as figures, symbols, letters, images, bar cords and combinations thereof.

[Infrared Absorbing Material]

Materials utilized for detection by density differences in this invention are not specifically limited. Secret intrinsic information invisible in a visible region is preferably formed by an infrared absorbing material. Information is preferably formed on the card surface by means of printing, transfer foil, stamping or thermal transfer utilizing an infrared absorbing material. Among them specifically preferable is to provide on the card surface or card cross-section by means of a thermal transfer method, a fusion thermal transfer method or a sublimation thermal transfer method.

Typical examples of an infrared absorbing substance are organic dyes having an absorption in an infrared region (800-1100 nm), preferably organic dyes having the main absorption in an infrared region, throughout visible and infrared regions, and among them preferable is any one provided having essentially no absorption in a visible region and having an absorption in an infrared region (800-1100 nm). Many compounds are known as an infrared absorbing dye, and, for example, cyanine dyes and oxonol dyes are listed.

Infrared absorbing substances utilized in this invention may be any one provided having essentially no absorption in a visible region and having an absorption in an infrared region, and preferably include dyes selected from thiopyrilium squalium dyes, thiopyrilium croconium dyes, pryrilium squalilum dyes or pyrilium croconium dyes.

Examples of infrared absorbing substances include, for example, IR-820B manufactured by Mitsui Chemicals Co., Ltd.

[Support]

Examples of a support include single-layered sheets comprised of synthetic resin sheets of such as polyester resins such as polyethylene terephthalate, polybutylene therephthalate and polyethylene terephthalate-isophthalate copolymer; polyolefin resins such as polyethylene, polypropylene and polymethyl pentene; polyfluoroethylene-type resins such as polyfluorovinyl, polyfluorovinylidene, polytetrafluoroethylene and ethylene-tetrafluoroethylene copolymer; polyamides such as 6-nylon, 6,6-nylon; vinyl polymers such as polyvinyl chloride, vinyl chloride-vinyl acetate copolymer, ethylene-vinyl acetate copolymer, ethylene-vinyl alcohol copolymer, polyvinyl alcohol, vinylon; biodegradable resins such as biodegradable aliphatic polyester, bio-degradable polycarbonate, biodegradable poly lactic acid, biodegradable polyvinyl alcohol, biodegradable cellulose acetate, bio-degradable polycaprolactone; cellulose-type resins such as cellulose triacetate and cellophane; acryl-type resins such as polymethyl methacrylate, polyethyl methacrylate, polyethyl acrylate and polybutyl acrylate; polystyrene; polycarbonate; polyallylate and polyimide; or of paper such as wood free paper, thin leaf paper, grassine paper and sulfuric acid paper; and of metal foil; or multi-layered sheets in which two or more sheets thereof are accumulated. The thickness of a support of this invention is 30-300 μm and preferably 50-200 μm. In the case of less than 50 μm, there produced problems of causing thermal shrinkage at the time of laminating the first and the second supports together.

In this invention, the coefficient of thermal shrinkage of a support at 150° C./30 min is preferably less than 1.2% based on a machine direction (MD) and less than 0.5% based on a tenter direction (TD). In the case of producing a card by coating or laminating adhesives from the both sides of the first support and the second support, supports may cause thermal shrinkage by heat resulting in difficulty of positioning in the successive cutting process and printing process. However, shrinkage of a support is prevented to solve conventional problems by utilizing an adhesive which works at low temperatures and a support having a coefficient of thermal shrinkage at 150° C./30 min of preferably less than 1.2% based on a machine direction (MD) and less than 0.5% based on a tenter direction (TD).

In this invention, preferably utilized is a support which has been obtained by being blended with a white pigment to improve the opacity or subjected to an annealing treatment to decrease a coefficient of thermal shrinkage and having a coefficient of thermal shrinkage at 150° C./30 min of preferably less than 1.2% based on a machine direction (MD) and less than 0.5% based on a tenter direction (TD). It has been confirmed that successive processes described above become difficult due to shrinkage of the support, when the coefficient of thermal shrinkage is more than 1.2% based on a machine direction (MD) and more than 0.5% based on a tenter direction (TD). Further, provided may be an adhesion enhancing treatment on the above-described support to improve adhesion during successive processes, and also anti-static treatment to protect the chip.

Specifically, suitably utilized are U2 Series, U4 Series and UL Series manufactured by Teijin Dupont Co., Ltd., Clisper G Series manufactured by Toyobo Co., Ltd.; E00 Series, E20 Series, E22 Series, X20 Series, E40 Series, E60 Series and QE Series manufactured by Toray Industries, Inc.

An image receiving layer and a cushion layer may be provided on the second support when necessary to form a face image of said card user. An image element is preferably provided on the substrate surface of a personal certification card, and bearing at least one selected from an certification image selected from such as a face image, an attribute information images and a format printing.

Commonly known resins can be utilized for an image receiving layer, and such examples include polyvinyl chloride resins, copolymer resins of vinyl chloride and other monomer (such as isobutylether and vinylpropionate), polyester resins, poly(meth)acrylate esters, polyvinyl pyrrolidone, polyvinyl acetal-type resins, polyvinyl butyral-type resins, polyvinyl alcohol, polycarbonate, cellulose triacetate, polystyrene, copolymers of styrene and other monomer (such as acrylic acid ester, acrylonitrile and ehtylene chloride), vinyltoluene acrylate resins, polyurethane resins, polyamide resins, urea resins, epoxy resins, phenoxy resins, polycaprolactone resins, polyacrylonitrile resins and modified compounds thereof, and preferable are polyvinyl chloride resins, copolymers of vinyl chloride and other monomers, polyester resins, polyvinyl acetal type resins, polyvinyl butyral type resins, copolymers of styrene and other monomers, and epoxy resins.

As for materials to form a cushion layer of this invention, preferable are photo-curable resins and polyolefins described in JP-A No. 2001-1693. For example, suitable are materials having flexibility and low thermal conductivity such as polyethylene, polypropyrene, ethylene-vinylacetate copolymer, ethylene-ethyl acrylate copolymer, styrene-butadiene-styrene block-copolymer, styrene-isobutyrene-styrene block-copolymer, styrene-ethylene-butadiene-styrene block-copolymer, styrene-hydrogenated isobutyrene-styrene block-copolymer and polybutadiene.

<Writing Layer>

A writing layer is a layer being made writable on the back surface of an IC card. Such a writing layer can be formed, for example, by incorporating inorganic fine particles such as calcium carbonate, talc, titanium oxide and barium sulfate in a thermoplastic resin (such as a polyolefin series such as polyethylene, and various copolymers) film. It can be also formed by "writing layer" described in JP-A No. 1-205155. The above-described writing layer is formed on the surface of a support on which a plurality of layers are not accumulated.

<Adhesive>

As adhesives utilized in an IC card of this invention, commonly used ones can be utilized, and hot-melt adhesives can be preferably utilized. The main component of hot-melt adhesives includes, for example, an ethylene-vinylacetate copolymer (EVA) type, a polyester type, a polyamide type, a thermoplastic elastomer type and a polyolefin type. However, in this invention, a card substrate tends to be bent and layers which are weak to high temperature processing such as an image receiving layer for image formation by thermal transfer, being provided on the card surface, may be damaged. Substrates may be suffered from such as thermal shrinkage because of high temperature lamination when supports are laminated via an adhesive, resulting in problems of deteriorated dimensional stability and position accuracy at the time of lamination. Therefore, it is preferable to laminate at lower than 80° C. in the case of supports being laminated via an adhesive, more preferably at 10-80° C. and furthermore preferably at 20-80° C. Specifically, a reactive hot-melt adhesive is preferable among low temperature adhesives.

As a reactive hot-melt adhesive, materials of moisture curing type are disclosed in JP-A Nos. 2000-036026, 2000-219855, 2000-211278 and 2000-369855. Photo-curable adhesives are disclosed in such as JP-A Nos. 10-316959 and 11-5964.

Any of these adhesives can be utilized, and unlimited materials are preferably utilized in this invention.

The layer thickness of an adhesive according to this invention is preferably 10-600 μm, more preferably 10-500 μm and furthermore preferably 10-450 μm, based on the thickness including electronic parts.

[Electronic Part (IC Module)]

An electronic part represents an information-recording member, and specifically an IC module comprised of an IC-chip which electrically records the information of said card user and a coil-form antenna member connected to said IC-chip. An IC-chip comprised of only a memory or a microcomputer in addition thereto. An electronic part may include a condenser, when necessary. In this invention, an electronic part is not limited as far as being required for an information-recording member.

An IC module is provided with an antenna coil, and any of such as a conductive paste printing process, a copper foil etching process and a wound-wire fuse process may be utilized in the case of being provided with an antenna pattern. Thermoplastic film such as polyester is utilized as an antenna support member, and polyimide is advantageous when further enhanced heat-resistance is required. Connection of an IC-chip and an antenna pattern is performed by conductive adhesives such as a silver paste and a copper paste (such as EN-4000 Series by Hitachi chemicals Ind. Co., Ltd. and XAP Series by Toshiba Chemicals Co., Ltd.) and an anisotropic conductive film (such as Aisofilm, manufactured by Hitachi Chemicals Co., Ltd.), or a method in which solder connection is performed, which are commonly known.

To avoid poor stability, caused by filling an adhesive layer resin after the parts including an IC-chip being mounted onto a predetermined position in advance, such as causing disconnection at bonding portions due to shear stress by the resin flow, and damaging smoothness of the surface due to flow or cooling of the resin, it is preferred to prepare the electronic part in a form of a porous resin film, a porous foaming resin film, a flexible resin sheet, a porous resin sheet or non-woven fabric sheet, in advance, to enclose the part in the resin layer. For example, a method described in such as JP-A No. 11-105476 can be utilized.

For example, a non-woven support includes a mesh-form fabric of such as a non-woven fabric, fabrics of plane weave, cross weave and satin weave. Further, can be utilized fabrics having piles called as moquette, brush velour, seal, velvet and suede. The materials includes one or more kinds of fibers selected from synthetic resins such as a polyamide type auch as 6-nylon, 6,6-nylon and 8-nylon, a polyester type such as polyethylene terephthalate, a polyolefin type such as polyethylene, a polyvinyl alcohol type, a polyvinilidene chloride type, a polyvinyl chloride type, an acryl type such as polyacrylonitrile, acrylamide and methacrylamide, and a polyurethane type; natural fibers such as silk, cotton, wool, a cellulose type and a cellulose ester type; regenerated fibers (such as rayon and acetate); and aramid fiber. In these fiber materials, preferable are a polyamide type such as 6-nylon and 6,6-nylon, an acryl type such as polyacrylonitrile, acrylamide and methacrylamide, a polyester type such as polyethylene terephthalate, rayon and acetate of a cellulose type and cellulose ester type as regenerated fibers, and aramid fiber.

Further, an IC-chip is preferably provided with a metal reinforcement plate as a reinforcement structure in the neighborhood of the IC-chip because it is weak in strength against point pressure.

The total thickness of an electronic part is preferably 10-300 μm, more preferably 30-300 μm and furthermore preferably 30-250 μm.

[Means to Provide Intrinsic Information and Secret Intrinsic Information]

In this invention, intrinsic information and secret intrinsic information are preferably stored while being mutually collated by one to one in a data server for manufacture and issue, and intrinsic information can be recorded in an IC-chip by a reader-writer connected to the data server. Further, intrinsic information having been recorded in an IC-chip in advance can be read out and additionally recorded, corrected or newly recorded in a data server. Plurality of data servers, which may be connected directly or indirectly, may present as far as information can be mutually collated by one to one, and manufacture information and issue information (personal certification) may be recorded in different data servers. It is preferable to record manufacture information and issue (personal certification) information in different data servers with respect to security.

In the case of secret intrinsic information is provided on an antenna support, any method can be utilized and it can be formed by any of a laser marking method, an inkjet method, a sublimation transfer method, an electrophotographic method and a thermal fusion method. Secret intrinsic information can be provided by such as a laser marking method, an inkjet method, a sublimation transfer method, an electrophotographic method and a thermal fusion method which are connected with a data server, and thermal transfer or inkjet is specifically preferable.

[Method for Equipping an Electronic Part of Predetermined Thickness Between the First Support and Second Support]

As a manufacturing method to equip the predetermined electronic part between first and second supports, any of a thermal lamination method, an adhesives lamination method and an extrusion-molding method, which are commonly known, can be utilized. Further, format printing or information recording may be performed before or after the first support and the second support are laminated together, and they can be formed by any method such as offset printing, gravure printing, silk printing, screen printing, intaglio printing, letterpress printing, an ink-jet method, a sublimation transfer method, an electrophotographic method and a thermal fusion method.

A manufacturing method of an IC card of this invention is preferably comprised of at least a process of an adhesive member, which is solid or viscous material at ordinary temperature, being provided on the card support, a process of an electronic part being arranged on this support, a process of a front-surface support provided with an adhesive member being arranged on this support so as to cover the electronic part, and a process of the support, the electronic part and the front-surface support being laminated together under a predetermined conditions of pressure and heating.

Said adhesives which are solid or viscous materials being softened at heating are preferably laminated by a method in which the adhesive itself is formed into a sheet-form and by melting an adhesive itself by heating or at ordinary temperature to be subjected to injection molding.

A temperature at which an electronic part can be adhered at a predetermined position between the first and second supports is preferably lower than 80° C., more preferably 0-80° C. and furthermore preferably 20-70° C. A cooling process is preferably provided to decrease such as bending of a support after lamination. The cooling temperature is preferably lower than 70° C., more preferably −10-70° C. and furthermore preferably 10-60° C.

At the time of lamination, pressing and heating are preferably performed to improve surface smoothness of a substrate and adhesion of the predetermined electronic part between the first and second supports, and such as an over-and-under press method or a laminating method for manufacturing is preferable. Preferable is a flat plane press method which gives nearly line contact to avoid rollers which gives unreasonable bending force even with a slight slip, considering to avoid a break of an IC parts in an IC module. The heating is preferably performed at 10-120° C. and more preferably at 30-100° C. The press is preferably performed at 0.1-300 kgf/cm$^2$ and more preferably at 0.1-100 kgf/cm$^2$. An IC-chip will be broken when the pressure is higher than this. The time for heating and pressing is preferably 0.1-180 sec and more preferably 0.1-120 sec.

The above-described laminated sheet or continuously coating laminated sheet formed by an adhesive-laminating method or a resin extrusion method, may be recorded with certification images and bibliographic items after being allowed to stand for a predetermined time for curing of an adhesive, and thereafter, shaped into a predetermined card size. As a method for shaping into a predetermined card size, mainly selected is a punching-out method or a cutting-out method.

<Image Forming Method of Image Recording Member>

An image element is provided on an image recording member comprised of the first and second supports of this invention having being laminated, and formed on the image or print surface side of a substrate, on which at least one selected from a certification image such as a face image, an attribute information image and a format printing is provided.

A face image is generally a full-colored image having gradation and formed, for example, by means of a sublimation thermal transfer recording method or silver halide color photographic method. Further, a letter information image is comprised of a binary image, and formed by such as a fusing thermal transfer recording method, a sublimation thermal transfer method, silver halide color photography, electrophotography and an inkjet method. In this invention, a certification image such as a face image, and an attribute information image are preferably recorded by a sublimation thermal transfer method.

Attribute information includes a name, an address, a birth date, a qualification, etc., and is recorded, usually as letter information, generally by means of a fusion thermal transfer recording method. A format printing or information recording may be also provided, and it can be formed by any method such as offset printing, gravure printing, silk printing, screen printing, intaglio printing, letterpress printing, an inkjet method, a sublimation transfer method, an electrophotographc method and a thermal fusion method.

Further, such as a watermarked printing, a hologram and a fine structure tint may be adopted for the purpose of preventing forgery and alternation. A layer to prevent forgery and alternation is suitably selected from a printed matter, a hologram, a bar cord, a matte pattern, a fine structure tint, a ground tint and a roughened pattern, and is comprised of such as a visible light absorbing coloring material, an ultraviolet absorbing material, an infrared absorbing material, a fluorescent brightening material, a metal evaporated layer, a glass evaporated layer, a bead layer, an optical variable device layer, a pearl ink layer and a scaly pigment layer.

[Sublimation Image Forming Method]

An ink sheet for sublimation thermal transfer recording can be composed of a support and an ink layer, formed thereon, containing sublimation dyes.

-Support-

As a support, there is no specific limitation, and those well known in the art, provided being superior in dimensional stability and resistant against heat at the time of recording by a thermal head, can be utilized.

-Sublimation Dye Containing Ink Layer-

The above-described ink layer containing sublimation dyes essentially includes a sublimation dye and a binder.

The above-described sublimation dye includes cyan dyes, magenta dyes and yellow dyes.

The above-described cyan dyes include naphthoquinone type dyes, anthraquinone type dyes and azomethine type dyes described in such as JP-A Nos. 59-78896, 59-227948, 60-24966, 60-53563, 60-130735, 60-131292, 60-239289, 61-19396, 61-22993, 61-31292, 61-31467, 61-35994, 61-49893, 61-148269, 62-191191, 63-91288, 63-91287 and 63-290793.

The above-described magenta dyes include anthraquinone type dyes, azo type dyes and azomethine type dyes described in such as JP-A Nos. 59-78896, 60-30392, 60-30394, 60-253595, 61-262190, 63-5992, 63-205288, 64-159 and 64-63194.

The above-described yellow dyes include methine type dyes, azo type dyes, quinophthalone type dyes and anthraisothiazole type dyes described in such as JP-A Nos. 59-78896, 60-27594, 60-31560, 60-53565, 61-12394 and 63-122594.

Further, specifically preferable sublimation dyes are azomethine dyes obtained by coupling reaction of compounds having an active open-chain type or closed-chain type methylene group, with oxidants of p-phenylenediamine derivatives or those of p-aminophenol derivatives; and indoaniline dyes obtained by coupling reaction of phenol or naphthol derivatives with oxidants of p-phenylenediamine derivatives or those of p-aminophenol derivatives.

Further, when a metal ion containing compound is included in an image receiving layer, it is preferable to include a sublimation dye, which forms a chelate upon reaction with the metal ion containing compound, in a sublimation dye containing ink layer. Examples of the chelate forming sublimation dyes include cyan dyes, magenta dyes and yellow dyes, forming a chelate of at least bidentate, described in JP-A Nos. 59-78893, 59-109349, Japanese Patent Application Nos. 2-213303, 2-214719 and 2-203742.

Preferable sublimation dyes capable of forming a chelate can be represented by the following general formula:

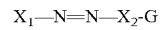

where, $X_1$ in the formula represents an aromatic carbon ring, in which at least one ring is composed of 5-7 atoms, or an atomic group necessary to complete a heterocyclic ring, provided that at least one of the adjacent carbon atoms which bond to the azo bond is a carbon atom substituted by nitrogen atom or a chelating group; $X_2$ represents a heterocyclic ring, in which at least one ring is composed of 5-7 atoms, or an aromatic carbon ring; G represents a chelating group.

Any sublimation dyes contained in the sublimation dye containing ink layer above described, may be any of a yellow dye, a magenta dye and a cyan dye when images to be formed are monocolor, and any two dyes out of three dyes above described or other sublimation dyes may be contained depending on the color of the image to be formed. The using amount of sublimation dyes described above generally 0.1-20.0 g, and preferably 0.2-5.0 g, based on 1 m² of a support.

A binder for the ink layer is not specifically limited, and those well known in the art can be used. Further, in the aforementioned ink layer, various kinds of additives well known in the art can be suitably added.

An ink sheet for sublimation thermal transfer recording can be prepared in such a manner that ink layer forming coating solution, which has been prepared by dispersing or solving various ink layer forming components described above, is coated on a support and then dried. The thickness of the thus prepared ink layer is generally 0.2-10.0 µm and preferably 0.3-3.0 µm.

In the following, this invention will be detailed based on examples, but the embodiment of this invention is not limited thereto. Hereininafter, "part(s)" represents "part(s) by weight".

EXAMPLE 1

Figure 2:
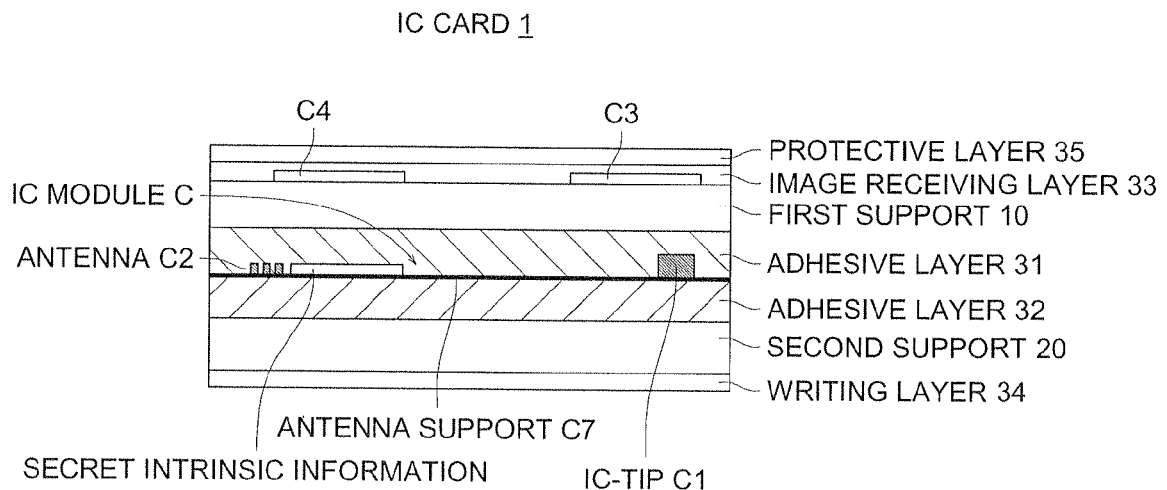
FIG. 2 is a drawing to show a layer configuration of an IC card.
Figure 2:
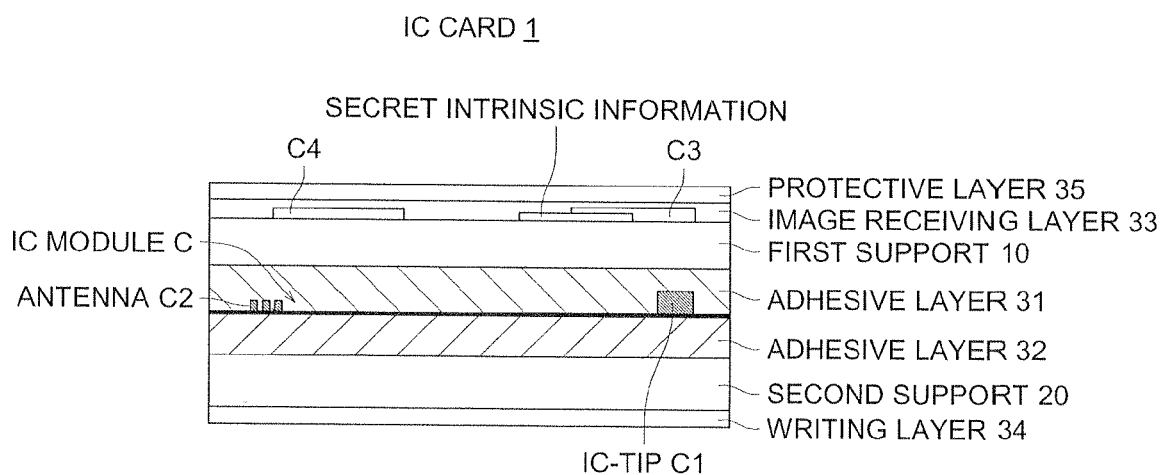

In the following, examples of this invention will be specifically explained. Example 1 is shown in FIGS. 1 and 2.

(Adhesive)

Curable Hot-melt Adhesive;

Macroplast QR3460 (a moisture-curable adhesive) manufactured by Henckel Co., Ltd.

(IC Module);

An IC-chip of 65 µm thick and 3×3 mm square was adhered with an electric conductive adhesive of 20µ thick on a support of 38 µm thick on which an antenna pattern having been formed by etching, and a reinforcement plate of 120 µm thick and 4×4 mm square plate-shape was adhered on the side opposite to the circuit plane with an epoxy-type resin of 10µ thick to prepare an IC module.

(Recording of Intrinsic Information and Secret Intrinsic Information)

As shown in FIG. 4(a), an intrinsic number, a manufacturing lot and an inspection record, which can identify the IC-chip, were recorded in a manufacture data server while being collated by 1 to 1, and an intrinsic number and an inspection record, which can identify the IC-chip, were recorded in a noncontact manner on the IC-chip of an IC module by use of a reader-writer.

Next, as shown in FIG. 4(a), an intrinsic number, which can identify the IC-chip, from a manufacture data server was recorded with black ink having absorption in a visible light region on the surface of antenna support C7 by means of an inkjet method.

(Front-Side First Support)

<Support 1>

The first image receiving layer coating solution, the second image receiving layer coating solution and the third image receiving layer coating solution, whose compositions are shown below, were coated in this order on a 188 µm thick support having been subjected to a corona discharge treatment, and dried resulting in accumulation of each thickness of 0.2 µm, 2.5 µm and 0.5 µm to prepare an image receiving layer.

| <First Image Receiving Layer Coating Solution> | |
|---|---|
| Polyvinyl butylal resin (Eslec BL-1, manufactured by Sekisui Chemical Co., Ltd.) | 9 parts |
| Isocyanate (Coronate HX, manufactured by Nippon Polyurethane Kogyo Co., Ltd.) | 1 part |
| Methyl ethyl ketone | 80 parts |
| Butyl acetate | 10 parts |

| <Second Image Receiving Layer Coating Solution> | |
|---|---|
| Polyvinyl butyral resin (Eslec BX-1, manufactured by Sekisui Chemical Co., Ltd.) | 6 parts |
| Metal ion containing compound (Compound MS) | 4 part |
| Methyl ethyl ketone | 80 parts |
| Butyl acetate | 10 parts |

| <Third Image Receiving Layer Coating Solution> | |
|---|---|
| Polyethylene wax (Hitech E1000, manufactured by Toho Chemical Industry Co., Ltd.) | 2 parts |
| Urethane modified ethylene acrylic acid copolymer (Hitech S6254, manufactured by Toho Chemical Industry Co., Ltd.) | 8 parts |
| Methyl cellulose (SM15, manufactured by Shin-Etsu Chemical Co., Ltd.) | 0.1 part |
| Water | 90 parts |

<Format Printing>

A logogram and OP varnish were printed successively by a resin letterpress method.

<Preparation of Backside Second Support>

<Preparation of Writing Layer>

The first writing layer coating solution, the second writing layer coating solution and the third writing layer coating solution of the following compositions were coated in this order on the surface of a 188 µm thick support 2, described above, having been subjected to a corona discharge treatment and dried, resulting in accumulation of each thickness of 5 µm, 15 µm and 0.2 µm to prepare a writing layer.

| <First Writing Layer Coating Solution> | |
|---|---|
| Polyester resin (Vilon 200, manufactured by Toyobo Co., Ltd.) | 8 parts |
| Isocyanate (Coronate HX, manufactured by Nippon Polyurethane Kogyo Co., Ltd.) | 1 part |
| Carbon black | a slight amount |
| Titanium dioxide particles (CR80, manufactured by Ishihara Sangyo Kaisha Ltd.) | 1 part |
| Methyl ethyl ketone | 80 parts |
| Butyl acetate | 10 parts |

| <Second Writing Layer Coating Solution> | |
|---|---|
| Polyester resin (Vilonal MD1200, manufactured by Toyobo Co., Ltd.) | 4 parts |
| Silica | 5 parts |
| Titanium dioxide particles (CR80, manufactured by Ishihara Sangyo Kaisha Ltd.) | 1 part |
| Water | 90 parts |

| <Third Writing Layer Coating Solution> | |
|---|---|
| Polyamide resin (Sanmide 55, manufactured by Sanwa Chemical Ind. Co., Ltd.) | 5 parts |
| Methanol | 95 parts |

A center line mean roughness of the writing layer obtained was 1.34 µm.

<Preparation of Sheet for IC Card>

An IC card manufacturing apparatus of FIG. 4(a) was utilized, and the above-described backside support and front-side support provided with an image receiving layer, which having been prepared by utilizing <support 1> as the first and the second supports, were utilized.

Adhesive 1 was coated on the front-side support provided with an image receiving layer by use of a T dies resulting in a thickness of 40 µm; adhesive 1 was coated on the backside support by use of a T dies resulting in a thickness of 290 µm; IC module 1 having the configuration shown in FIGS. 5-7 was mounted on said front side support provided with an adhesive as shown in FIG. 4(a) so as to the circuit plane was on the backside support side; and then the resulting configuration, being sandwitched by upper and lower sheets, was laminated at 70° C. for 1 minute to prepare a sheet for an IC card. A thickness of the sheet for an IC card thus prepared was 760 µm. After preparation, the sheet was stored under an environment of 25° C. and 50% RH for 7 days.

The sheet for an IC card thus prepared was subjected to a stamping process by use of an IC card stamping dies shown in FIGS. 9 and 10.

The information recorded was invisible by reflection from the surface of an IC card surface, the transmission densities of a non-recorded portion and a recorded portion were 1.3 and 1.8 respectively (measured by a densitometer based on ISO 5), resulting in a difference of 0.5.

(Personal Information Recording Method on Personal Certification Card and Surface Protection Method)

An intrinsic number which can identify an IC-chip was read out from said IC card having been subjected to a recording process of intrinsic information and secret information by use of a noncontact reader-writer, and was recorded while being collated with personal certification information (a name, an employee number, a face image and attribute information) of the data server shown in FIG. 4(a), as well as personal certification information (a name, an employee number, a face image and attribute information) was recorded on an IC-chip of the IC card by use of a non-contact reader-writer.

Thereafter, personal certification information (a name, an employee number, a face image and attribute information) was recorded on the card surface in to the following manner and a surface protection was performed to prepare a personal certification card provided with a format printing.

<Preparation of Ink Sheet for Sublimation Thermal Transfer Recording>

Ink sheets of three colors of yellow, magenta and cyan were obtained by providing a yellow ink layer coating solution, a magenta ink layer coating solution and a cyan ink layer coating solution of the following compositions on a polyethylene terephthalate sheet of 6 μm thick, of which the backside had been subjected to anti-melt-adhesion treatment, so as to make each thickness of 1 μm.

| <Yellow Ink Layer Coating Solution> | |
|---|---|
| Yellow dye (Compound Y-1) | 3 parts |
| Polyvinylacetal | 5.5 parts |
| (Denkabutyral KY-24, manufactured by of Denki Kagaku Kogyo K.K.) | |
| Polymethyl methacrylate modified polystyrene | 1 part |
| (Lededa GP-200, manufactured by Toagosei Co., Ltd.) | |
| Urethane modified silicone oil | 0.5 parts |
| (Daiaromer SP-2105, manufactured by Dainichiseika Colour & Chemicals Mfg. Co., Ltd.) | |
| Methyl ethyl ketone | 70 parts |
| Toluene | 20 parts |

| <Magenta Ink Layer Coating Solution> | |
|---|---|
| Magenta dye (Compound M-1) | 2 parts |
| Polyvinylacetal | 5.5 parts |
| (Denkabutyral KY-24 manufactured by Denki Kagaku Kogyo K. K.) | |
| Polymethyl methacrylate modified polystyrene | 2 parts |
| (Lededa GP-200, manufactured by Toagosei Co., Ltd.) | |
| Urethane modified silicone oil | 0.5 parts |
| (Daiaromer SP-2105, manufactured by Dainichiseika Colour & Chemicals Mfg. Co., Ltd.) | |
| Methyl ethyl ketone | 70 parts |
| Toluene | 20 parts |

| <Cyan Ink Layer Coating Solution> | |
|---|---|
| Cyan dye (Compound C-1) | 1.5 parts |
| Cyan dye (Compound C-2) | 1.5 parts |
| Polyvinylacetal | 5.6 parts |
| (Denkabutyral KY-24, manufactured by Denki Kagaku Kogyo K. K.) | |
| Polymethyl methacrylate modified polystyrene | 1 part |
| (Lededa GP-200, manufactured by Toagosei Co., Ltd.) | |
| Urethane modified silicone oil | 0.5 parts |
| (Daiaromer SP-2105, manufactured by Dainichiseika Colour & Chemicals Mfg. Co., Ltd.) | |
| Methyl ethyl ketone | 70 parts |
| Toluene | 20 parts |

<Preparation of Ink Sheets for Fusion Thermal Transfer Recording>

An ink sheet was obtained by coating an ink layer coating solutions of the following compositions so as to make a thickness of 2 μm on a polyethylene terephthalate sheet of 6 μm thick, of which the backside had been subjected to anti-melt-adhesion treatment, and then drying.

| <Ink Layer Coating Solution> | |
|---|---|
| Carnauba wax | 1 part |
| Ethylene vinylacetate copolymer | 1 part |
| (EV40Y, manufactured by Mitsui Dupont Chemicals Co.) | |
| Carbon black | 3 parts |
| Phenol resin | 5 parts |
| (Tamanol 521, manufactured by Arakawa Chemical Industries Co., Ltd.) | |
| Methyl ethyl ketone | 90 parts |

<Formation of Face Image>

A personal image having tone was formed on an image receiving layer by overlapping an image receiving layer and an ink-side of an ink sheet for sublimation thermal transfer recording, and heating from the ink sheet side by use of a thermal head under conditions of an output power of 0.23 W/dot, a pulse width of from 0.3-4.5 m·sec and a dot density of 16 dot/mm. In the image, dyes described above and nickel in the image receiving layer formed complexes.

<Formation of Letter Information>

Letter information was formed on OP vanish by overlapping an OP vanish portion and an ink side of an ink sheet for fusion thermal transfer recording and heating from the ink sheet side by use of a thermal head under conditions of an output power of 0.5 W/dot, a pulse width of 1.0 m·sec and a dot density of 16 dot/mm.

<Surface Protecting Method>

<Preparation Method of Surface Protective Layer>

<Preparation of Actinic-ray Curable Transfer Foil 1>

The following compositions were accumulated on a peeling layer of polyethylene terephthalate film 2 of 25 μm thick, on which a peeling layer comprised of a fluorine resin layer of 0.1 μm had been provided, to prepare actinic-ray curable transfer foil 1.

| <Actinic-ray Curable Compound> | |
|---|---|
| A-9300, manufactured by Shin-Nakamura Kagaku Co., Ltd./EA-1020, manufactured by Shin-Nakamura Kagaku Co., Ltd. = | 35/11.75 parts |
| Reaction initiator: Irgacure 184, manufactured by Ciba Geigie Co. | 5 parts |
| Additive: Unsaturated group containing resin | 48 parts |
| Other additive: Surfactant F-179, manufactured by Dainippon Ink & Cemicals Inc. | 0.25 parts |

-continued

<Intermediate Layer Coating Solution>
layer thickness: 1.0 μm

| | |
|---|---|
| Polyvinyl butyral resin (Eslec BX-1, manufactured by Sekisui Chemicals Co., Ltd.) | 3.5 parts |
| Taftex M-1913 (Asahi Chemical Co., Ltd.) | 5 parts |
| Hardener: Polyisocyanate (Coronate HX, manufactured by Nippon Polyurethane Co., Ltd.) | 1.5 parets |
| Methyl ethyl ketone | 90 parts |
| Curing after coating of a hardener was performed at 50° C. for 24 hours. | |

(Preparation of Adhesive Layer Coating Solution)
layer thickness: 0.5 μm

| | |
|---|---|
| Urethane modified ethylene ethylacrylate copolymer (Heitech S6254B manufactured by Toho Chemical industry Co., Ltd.) | 8 parts |
| Polyacrylic acid ester copolymer (Julimer AT510 manufactured by Nippon Junyaku Co., Ltd.) | 2 parts |
| Water | 45 parts |
| Ethanol | 45 parts |

Further, an adhesive layer was transferred with a pressure of 150 kg/cm² and heating of 1.2 second on said image receiving layer recorded with a letters and images, by use of actinic ray curable thermal transfer foil 1 having the above-described composition and a heat roller having a diameter of 5 cm and a rubber hardness of 85.

[Verification of Truth, and Collection of Manufacturing and Issuing Information]

The intrinsic information (the intrinsic number specifying the chip) having been recorded on the IC-chip of the card prepared was read out by a noncontact reader-writer, and simultaneously the secret intrinsic information (the intrinsic number specifying the chip) having been recorded on the card surface was read out by a transmission densitometer. Then, the intrinsic numbers specifying an IC-chip were extracted for collation, and they were proved to be the same resulting in judgment of the card to be true.

Further, after an IC-chip had been intentionally destroyed, the information on the IC-chip was unable to be read out by a noncontact reader-writer; while the secret intrinsic information (intrinsic number specifying the chip) having been recorded on an antenna support inside the card was able to be read out by a transmission densitometer, so that to collate the manufacturing information by a data server; resulting in confirmation of the same intrinsic number and collection of the intrinsic number, manufacturing lot and inspection record.

Further, when the secret intrinsic information (the intrinsic number specifying the chip) was read out by a transmission densitometer and collated by a issue data server, the descriptions on the card surface and the personal information (the name, the employee number, the face image and attribute information) in the issue data server coincided to judge the card to be true.

EXAMPLE 2

An IC card was prepared in a similar manner to example 1, except that intrinsic information to be recorded on an IC card was thermal transfer recorded on antenna support C7 by use of a polyethylene terephthalate sublimation ribbon having a thickness of 6 μm, the backside of which contained an infrared absorbing dye having a maximum absorption at 850 nm and had been subjected to an anti-melt adhesion treatment, and a thermal head, followed by being read out by an infrared camera.

Similar to example 1, verification of truth and collection of manufacturing information were possible.

In this invention, security of a card is improved by providing secret intrinsic information on an antenna support sealed in the card, because it is necessary to break the card to be altered. Further, extremely high security is assured against tamper, forgery or misuse of intrinsic information by a third person with malice, since intrinsic information on a card surface can be collated with the intrinsic information having been recorded in an external data server to judge truth as well as the card surface information and secret intrinsic information can be collated.

Further, because of providing secret intrinsic information on an antenna support sealed in the card the design of a card surface is not restricted and is to be satisfied as well as the design and security stand together.

EXAMPLE 3

As shown in FIG. 4(*b*), an IC card was prepared in a similar manner to example 1, except that the secret intrinsic number, which can specify the chip by being collated by a data server was thermal transfer recorded on the IC card surface by use of a polyethylene terephthalate sublimation ribbon having a thickness of 6 μm, the backside of which contained an infrared absorbing dye having a maximum absorption at 850 nm and had been subjected to an anti-melt adhesion treatment, and a thermal head. The information recorded was invisible in a visible region.

[Verification of Truth, and Collection of Manufacturing and Issuing Information]

Verification of truth, and collection of manufacturing and issuing information were performed by use of an IC card judgment system of FIG. 11.

The intrinsic information (the intrinsic number specifying the chip) and personal information (the name, the employee number and the face image)) having been recorded in the chip of the card prepared was read out by a noncontact reader-writer, as well as secret intrinsic information (the intrinsic number specifying the chip) having been recorded on the card surface was simultaneously read out by an infrared camera; then the intrinsic numbers specifying the chip were extracted and collated to prove to be the same enabling judgment of truth.

Further, information on an IC-chip was unable to be read out by a non-contact reader-writer after the IC-chip had been intentionally destroyed; while the secret intrinsic information (the intrinsic number specifying the chip) having been recorded on the card surface was able to be read out by an infrared camera to collate the intrinsic number by a data server for manufacturing and issuing, resulting in confirmation of the same intrinsic number and collection of the intrinsic number, manufacturing lot, inspection record and personal information (the name, the employee number and the face image) which can specify the IC-chip.

Figure 13:
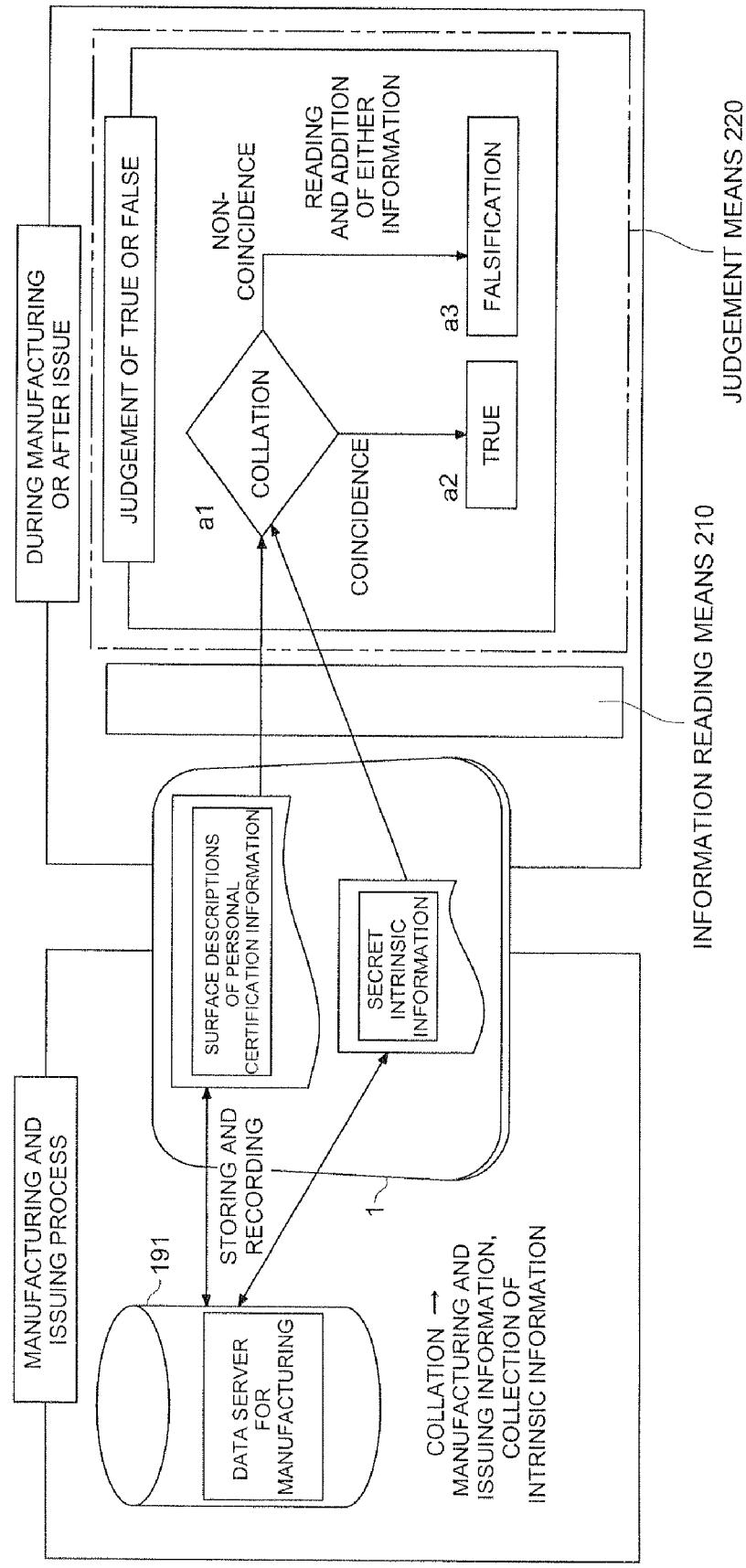
FIG. 13 is a brief constitution drawing of another embodiment of an IC card judgment system.

Further, verification of truth, and collection of manufacturing and issuing information were performed by use of an IC card judgment system of FIG. 13.

The surface descriptions of personal certification information (the name, the employee number and the face image) having been recorded on the chip of the card prepared was read out by a noncontact reader-writer, as well as secret intrinsic information (the intrinsic number specifying the chip) having been recorded on the card surface was simultaneously read out by an infrared camera; then the intrinsic numbers specifying the chip were extracted and collated to prove to be the same resulting in judgment of truth.

Further, the information on the IC-chip was unable to be read out by a noncontact reader-writer after an IC-chip had been intentionally destroyed, while the secret intrinsic information (the intrinsic number specifying the chip) having been recorded on the card surface was able to be read out by an infrared camera to be collated by a data server for manufacturing and issuing, resulting in confirming the same intrinsic number and obtaining the intrinsic number, manufacturing lot, inspection record and personal information (the name, the employee number and the face image) which can specify the IC-chip.

EXAMPLE 4

An IC card was prepared in a similar manner to example 3, except that secret intrinsic information to be recorded on the IC card was recorded on the cross section of a card by means of a bar cord as shown in FIG. 3(c).

Similar to example 3, verification of truth and collection of manufacturing and issuing information were possible.

What is claimed is:

1. A method for manufacturing an IC card, comprising the steps of:
   storing intrinsic information in an IC-chip of an IC module including the IC-chip and an antenna supported by an antenna supporting member;
   providing hidden intrinsic information on a part of the antenna supporting member;
   coating adhesive between two base plates opposing to each other to provide an adhesive layer;
   mounting the IC module on a predetermined position between the two base plates with the adhesive layer;
   laminating two base plates opposing to each other to prepare a card substrate;
   stamping card substrate into a card-shape to prepare a card;
   recording information of personal certification on the card surface; and
   writing the information of personal certification into the IC-chip wherein hidden intrinsic information corresponding to the stored intrinsic information is provided on said antenna supporting member either in such a way that the hidden intrinsic information is invisible by reflected light from the surface of the IC card and is read out from transmission light due to a transmission density difference between the recorded part of the hidden intrinsic information and a non-recorded part, or by use of an infrared absorbing material which is invisible in a visible light region.

2. An IC card manufacturing apparatus comprising:
   a storing section for storing intrinsic information in an IC-chip of an IC module including the IC-chip and an antenna supported by an antenna supporting member;
   a first recording section for recording hidden intrinsic information on a part of the antenna supporting member;
   a first coating section for coating adhesive between two base plates to prepare an adhesive layer;
   a mounting section for mounting the IC module on a predetermined position between the two base plates with the adhesive layer;
   a pressing section for laminating two base plates opposing to each other to prepare a card substrate;
   a stamping section for stamping card substrate into a card-shape to prepare a card;
   a second recording section for recording information of personal certification on the card surface; and
   a writing section for writing the information of personal certification into the IC-chip wherein hidden intrinsic information corresponding to the stored intrinsic information is recorded on said antenna supporting member either in such a way that the hidden intrinsic information is invisible by reflected light from the surface of the IC card and is read out from transmission light due to a transmission density difference between the recorded part of the hidden intrinsic information and a non-recorded part, or by use of an infrared absorbing material which is invisible in a visible light region.

3. The IC card manufacturing apparatus of claim 2, further comprising:
   a second coating section for coating a protective layer to protect the information of personal certification recorded on the card surface.

4. The IC card manufacturing apparatus of claim 2, further comprising:
   an information sending section for sending the intrinsic information and the hidden intrinsic information into a data server which stores at least one of a card manufacturing information data and a card issuing information data, so that two information are stored correspondently in the data server.

5. The IC card manufacturing apparatus of claim 2, wherein said first recording section records the hidden intrinsic information by thermal transfer recording or ink-jet recording.

6. An IC card judging system comprising:
   an information reading section for reading intrinsic information and hidden intrinsic information of the IC card;
   a collating section for collating the intrinsic information with the hidden intrinsic information; and
   a determining section for determining whether the IC card is valid according to the result of collating;
   wherein the IC card comprises,
   an IC module including an IC-chip in which intrinsic information is stored at the stage of card manufacturing or card issuing and an antenna supported by an antenna supporting member; and
   two base plates between which the IC module incorporated with an adhesive layer;
   wherein hidden intrinsic information corresponding to the stored intrinsic information is recorded on a part of the antenna supporting member in such a way that the hidden intrinsic information is invisible by reflection light from the surface of the IC card and is read out from transmission light due to a transmission density difference between the recorded part of the hidden intrinsic information and a non-recorded part.

7. The IC card judging system of claim 6, further comprising:
   a data server in which the intrinsic information and the hidden intrinsic information are stored correspondently;
   wherein the collating section collates at least one of the intrinsic information and the hidden intrinsic information obtained by the information reading section with at least one of the intrinsic information and the hidden intrinsic information stored in the data server.

8. A method for manufacturing an IC card, comprising the steps of:
   storing intrinsic information in an IC-chip of an IC module including the IC-chip and an antenna;

coating adhesive between two base plates to provide an adhesive layer;

mounting the IC module on a predetermined position between the two base plates with an adhesive layer;

laminating two base plates opposing to each other to prepare a card substrate;

stamping card substrate into a card-shape to prepare a card;

providing hidden intrinsic information on at least one of the card surface and card cross-section by use of an infrared absorbing material which is invisible in a visible light region wherein hidden intrinsic information corresponds to stored intrinsic information;

recording information of personal certification on the card surface; and writing information of personal certification into the IC-chip.

9. An IC card manufacturing apparatus comprising:

a storing section for storing intrinsic information in an IC-chip of an IC module including the IC-chip and an antenna;

a first coating section for coating adhesive between two base plates to prepare an adhesive layer;

a mounting section for mounting the IC module on a predetermined position between the two base plates with an adhesive layer;

a pressing section for laminating two base plates opposing to each other to prepare a card substrate;

a stamping section for stamping card substrate into a card-shape to prepare a card;

a first recording section for recording hidden intrinsic information on at least one of the card surface and card cross-section by use of an infrared absorbing material which is invisible in a visible light region wherein hidden intrinsic information corresponds to stored intrinsic information;

a second recording section for recording information of personal certification on the card surface; and a writing section for writing information of personal certification into the IC-chip.

10. The IC card manufacturing apparatus of claim 9, further comprising:

a second coating section for coating a protective layer to protect the information of personal certification recorded on the card surface.

11. The IC card manufacturing apparatus of claim 9, further comprising:

an information sending section for sending the intrinsic information and the hidden intrinsic information into a data server which stores at least one of a card manufacturing information data and a card issuing information data, so that two information are stored correspondently in the data server.

12. The IC card manufacturing apparatus of claim 9, wherein said first recording section records the hidden intrinsic information by thermal transfer.

13. An IC card judging system comprising:

an information reading section for reading intrinsic information and hidden intrinsic information of the IC card;

a collating section for collating the intrinsic information with the hidden intrinsic information; and a determining section for determining whether the IC card is valid according to the result of collating;

wherein the IC card comprises, an IC module including an IC-chip in which intrinsic information is stored at the stage of card manufacturing or card issuing and an antenna; and two base plates between which the IC module incorporated with an adhesive layer;

wherein hidden intrinsic information is recorded on at least one of the card surface and card cross-section by use of an infrared absorbing material which is invisible in a visible light region wherein hidden intrinsic information corresponds to stored intrinsic information.

14. The IC card judging system of claim 13, wherein said information reading section reads the hidden intrinsic information and information of personal certification recorded on the card surface, wherein said collating section for collating the hidden intrinsic information with the information of personal certification.

15. The IC card judging system of claim 13, further comprising:

a data server in which the intrinsic information and the hidden intrinsic information are stored correspondently;

wherein the collating section collates at least one of the intrinsic information and the hidden intrinsic information obtained by the information reading section with at least one of the intrinsic information and the hidden intrinsic information stored in the data server.

16. The IC card judging system of claim 13, said hidden intrinsic information comprising at least one of information of an intrinsic card number and information of a personal certification.

* * * * *